US012638380B2

(12) United States Patent
Wu et al.

(10) Patent No.: US 12,638,380 B2
(45) Date of Patent: May 26, 2026

(54) DATA ANALYSIS METHOD, COMPUTING DEVICE, AND STORAGE MEDIUM

(71) Applicant: Fulian Yuzhan Precision Technology Co., Ltd., Shenzhen (CN)

(72) Inventors: Chen-Ting Wu, New Taipei (TW); Hong-Wei Zhang, Zhengzhou (CN); Qing-Yu Wang, Shenzhen (CN); Li Yan, Shenzhen (CN); Deng-Kui Tian, Shenzhen (CN); Cheng-Lun Lee, New Taipei (TW)

(73) Assignee: Fulian Yuzhan Precision Technology Co., Ltd., Shenzhen (CN)

( * ) Notice: Subject to any disclaimer, the term of this patent is extended or adjusted under 35 U.S.C. 154(b) by 844 days.

(21) Appl. No.: 17/993,180

(22) Filed: Nov. 23, 2022

(65) Prior Publication Data

US 2023/0160811 A1     May 25, 2023

(30) Foreign Application Priority Data

Nov. 23, 2021   (CN) .......................... 202111395799.5

(51) Int. Cl.
  *G01N 21/25*          (2006.01)
(52) U.S. Cl.
  CPC ................................... *G01N 21/25* (2013.01)
(58) Field of Classification Search
  CPC .......... G01F 1/363; G01F 5/005; G01F 1/366
  See application file for complete search history.

(56) References Cited

U.S. PATENT DOCUMENTS 6,466,881 B1 * 10/2002 Shih .................. H01J 37/32477
                                                    702/33
7,365,860 B2 *  4/2008 Price .................... C25D 11/022
                                                    356/497

(Continued)

FOREIGN PATENT DOCUMENTS

CA        2822837 A1 *  6/2012 ........... B07C 5/3425
CN     106204324        12/2016

(Continued)

OTHER PUBLICATIONS

A Pérez del Pino, J.M Fernzández-Pradas, p. Serra, J.L Morenza, "Coloring of titanium through laser oxidation: comparative study with anodizing", Oct. 1, 2004, Surface and Coatings Technology, vol. 187, Issue 1, pp. 106-112, ISSN 0257-8972, https://doi.org/10.1016/j.surfcoat.2004.02.001. (Year: 2004).*

(Continued)

*Primary Examiner* — Shelby A Turner
*Assistant Examiner* — Yaritza H Perez Bermudez
(74) *Attorney, Agent, or Firm* — ScienBiziP, P.C.

(57)          ABSTRACT

A data analysis method for optimization of aluminum anodizing and dyeing process acquires a plurality of sample data groups, each sample data groups comprising dyeing result data and parameter data of multiple processing parameters. Contribution value of each processing parameter data relative to the dyeing result data in each of the plurality of sample data groups is determined, and the contribution values are used to determine at least one essential processing parameter. The essential processing parameters are then adjusted according to a data analysis result for improving quality of products. A computing device and storage medium are also provided.

19 Claims, 15 Drawing Sheets

Acquiring a plurality of sample data groups, each sample data group comprising dyeing result data and processing parameter data of multiple processing parameters ⟋ ~101'

Determining a contribution value of the processing parameter data of each processing parameter to the dyeing result data in one of the sample data groups by shapley value method ⟋ ~110

Determining at least one essential processing parameter affecting the dyeing results by analyzing the contribution values of the processing parameter data ⟋ ~103'

(56)             References Cited

U.S. PATENT DOCUMENTS

| | | | |
|---|---|---|---|
| 9,970,154 B1 * | 5/2018 | Tsai | D06P 1/0032 |
| 10,019,021 B1 * | 7/2018 | Lee | H02M 3/158 |
| 2017/0088917 A1 * | 3/2017 | Curran | C25D 11/06 |
| 2017/0123411 A1 * | 5/2017 | Cheng | G06N 7/01 |
| 2018/0057693 A1 * | 3/2018 | Wilson | C09C 1/642 |
| 2018/0135243 A1 * | 5/2018 | Tsai | D06P 1/0032 |
| 2018/0202050 A1 * | 7/2018 | Jeong | C23C 22/60 |
| 2018/0223413 A1 * | 8/2018 | Jeong | C23C 14/081 |
| 2018/0289413 A1 * | 10/2018 | You | A61B 18/1206 |
| 2019/0032237 A1 * | 1/2019 | Kim | C25D 13/12 |
| 2019/0205572 A1 * | 7/2019 | Duan | G06F 21/44 |
| 2019/0227378 A1 * | 7/2019 | Watanabe | G02F 1/133533 |
| 2020/0173050 A1 * | 6/2020 | Curran | H05K 5/04 |
| 2020/0383224 A1 * | 12/2020 | Curran | C25D 11/243 |
| 2021/0002783 A1 * | 1/2021 | Kikuchi | C25D 11/10 |
| 2021/0011371 A1 * | 1/2021 | Yamaguchi | G03F 1/84 |
| 2021/0016344 A1 * | 1/2021 | Lee | B22D 11/003 |
| 2021/0054469 A1 * | 2/2021 | Jeon | C25D 11/246 |
| 2021/0087656 A1 * | 3/2021 | Sassaman | C22C 1/026 |
| 2021/0285120 A1 * | 9/2021 | Fukatsu | C25D 11/08 |
| 2022/0298666 A1 * | 9/2022 | Dumont | C25D 11/24 |
| 2022/0351094 A1 * | 11/2022 | Hamamoto | G06N 20/00 |
| 2022/0364253 A1 * | 11/2022 | Hou | C25D 11/12 |
| 2023/0102327 A1 * | 3/2023 | Lee | H05K 5/04 |
| | | | 361/679.02 |
| 2023/0146301 A1 * | 5/2023 | Kim | C22C 21/00 |
| | | | 361/679.01 |
| 2023/0161842 A1 * | 5/2023 | Wu | G05B 13/024 |
| | | | 700/28 |
| 2023/0384769 A1 * | 11/2023 | Wu | G05B 19/41885 |
| 2024/0018644 A1 * | 1/2024 | Yu | C23C 28/00 |
| 2024/0296163 A1 * | 9/2024 | Zhang | G06F 18/20 |
| 2024/0301581 A1 * | 9/2024 | Moriguchi | C25D 11/18 |
| 2024/0401220 A1 * | 12/2024 | Jiang | C09D 5/08 |

FOREIGN PATENT DOCUMENTS

| | | | | | |
|---|---|---|---|---|---|
| CN | 106649907 | | 5/2017 | | |
| CN | 105806483 B | * | 1/2019 | | G16Z 99/00 |
| CN | 109402924 A | * | 3/2019 | | D06B 23/20 |
| CN | 111325557 A | * | 6/2020 | | G06Q 40/02 |
| CN | 111815435 A | * | 10/2020 | | G06Q 40/03 |
| CN | 113643100 A | * | 11/2021 | | G06Q 30/0629 |
| CN | 113822384 A | * | 12/2021 | | G06F 18/24323 |
| CN | 114252401 A | * | 3/2022 | | G01N 21/251 |
| CN | 118814249 A | * | 10/2024 | | C25D 11/00 |
| DE | 102015225458 A1 | * | 6/2017 | | A45D 44/005 |
| DE | 102019101449 A1 | * | 7/2020 | | C09D 5/08 |
| EP | 3088566 B1 | * | 8/2018 | | C23C 28/34 |
| EP | 4116466 A2 | * | 1/2023 | | B22D 18/06 |
| JP | 2005306045 A | * | 11/2005 | | |
| JP | 3728952 B2 | * | 12/2005 | | |
| JP | 3738940 B2 | * | 1/2006 | | |
| JP | 4040787 B2 | * | 1/2008 | | |
| JP | 6286561 B2 | * | 2/2018 | | C23C 22/62 |
| KR | 20210038343 A | * | 4/2021 | | C25D 11/22 |
| TW | 1670474 B | * | 9/2019 | | |
| WO | WO-2015010154 A1 | * | 1/2015 | | G06K 19/06084 |
| WO | WO-2017103050 A1 | * | 6/2017 | | A61B 5/448 |
| WO | WO-2020110903 A1 | * | 6/2020 | | C25D 11/10 |
| WO | WO-2021108680 A1 | * | 6/2021 | | H04L 67/12 |
| WO | WO-2021161291 A1 | * | 8/2021 | | C12N 5/0068 |

OTHER PUBLICATIONS

Ghorbani, Amirata & Zou, James & Esteva, Andre., "Data Shapley Valuation for Efficient Batch Active Learning", Apr. 16, 2021, pp. 1-13. 10.48550/arXiv.2104.08312. (Year: 2021).*

* cited by examiner

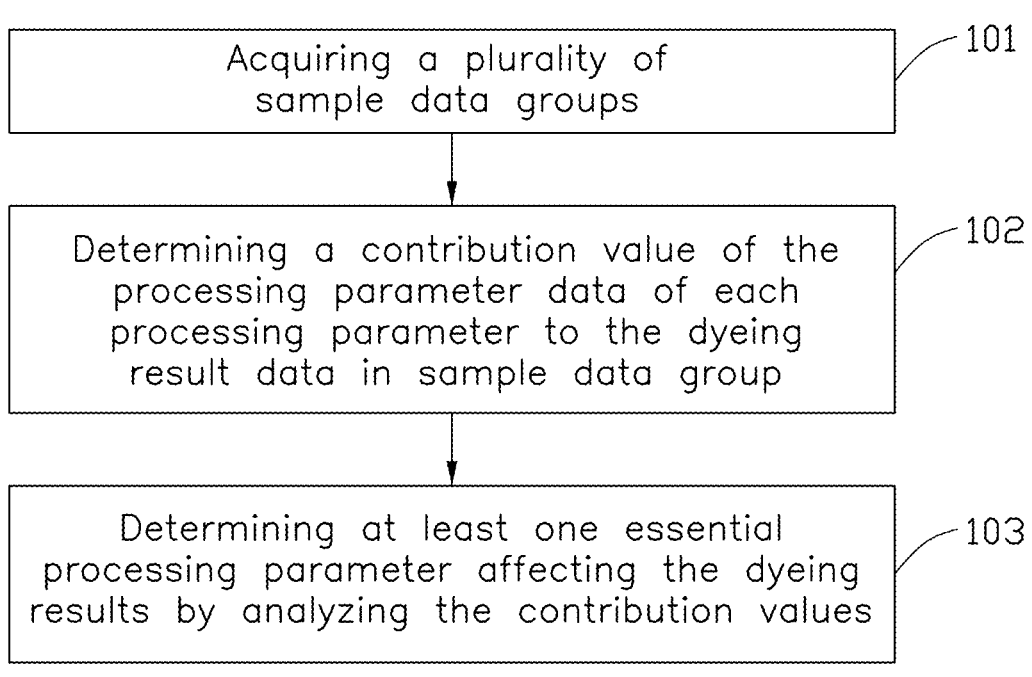

Acquiring a plurality of sample data groups ⟋101

Determining a contribution value of the processing parameter data of each processing parameter to the dyeing result data in sample data group ⟋102

Determining at least one essential processing parameter affecting the dyeing results by analyzing the contribution values ⟋103

FIG. 2

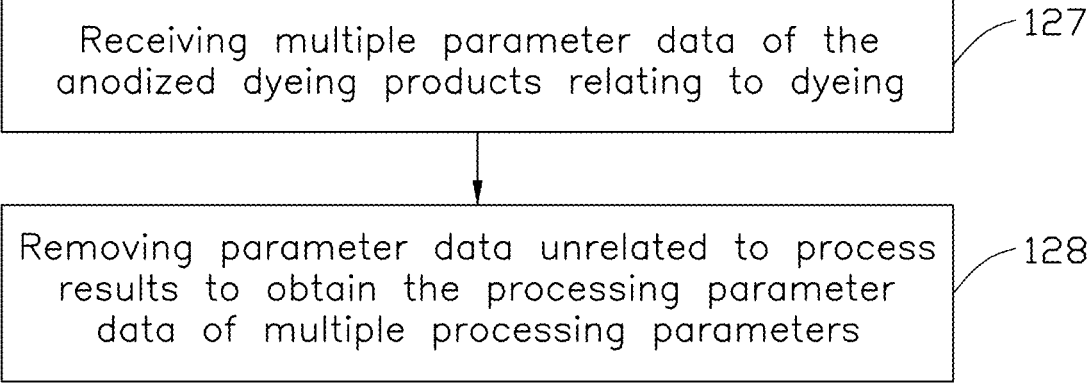

Receiving multiple parameter data of the anodized dyeing products relating to dyeing ⟋127

Removing parameter data unrelated to process results to obtain the processing parameter data of multiple processing parameters ⟋128

FIG. 3

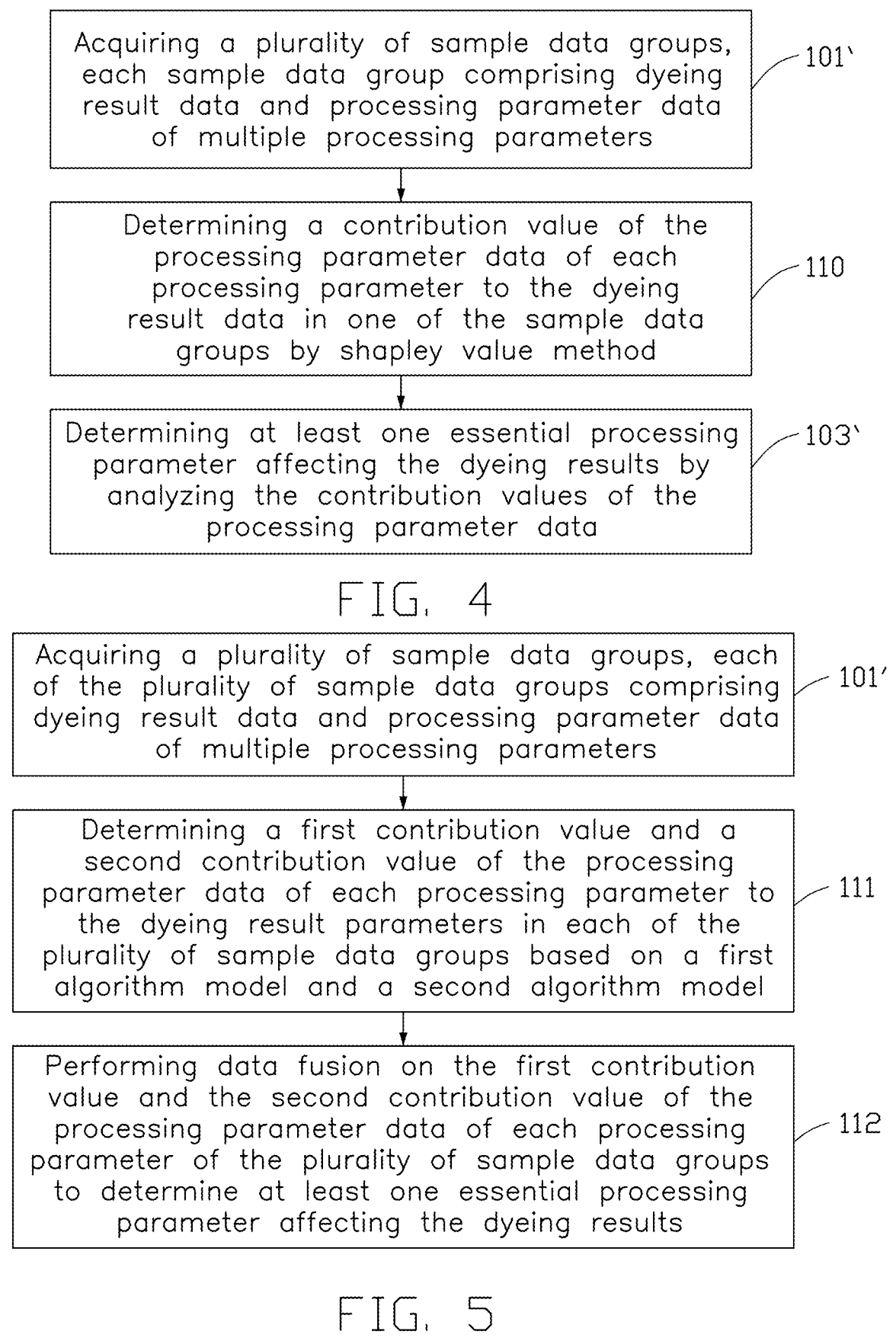

Acquiring a plurality of sample data groups, each sample data group comprising dyeing result data and processing parameter data of multiple processing parameters     ─ 101'

Determining a contribution value of the processing parameter data of each processing parameter to the dyeing result data in one of the sample data groups by shapley value method     ─ 110

Determining at least one essential processing parameter affecting the dyeing results by analyzing the contribution values of the processing parameter data     ─ 103'

FIG. 4

Acquiring a plurality of sample data groups, each of the plurality of sample data groups comprising dyeing result data and processing parameter data of multiple processing parameters     ─ 101'

Determining a first contribution value and a second contribution value of the processing parameter data of each processing parameter to the dyeing result parameters in each of the plurality of sample data groups based on a first algorithm model and a second algorithm model     ─ 111

Performing data fusion on the first contribution value and the second contribution value of the processing parameter data of each processing parameter of the plurality of sample data groups to determine at least one essential processing parameter affecting the dyeing results     ─ 112

FIG. 5

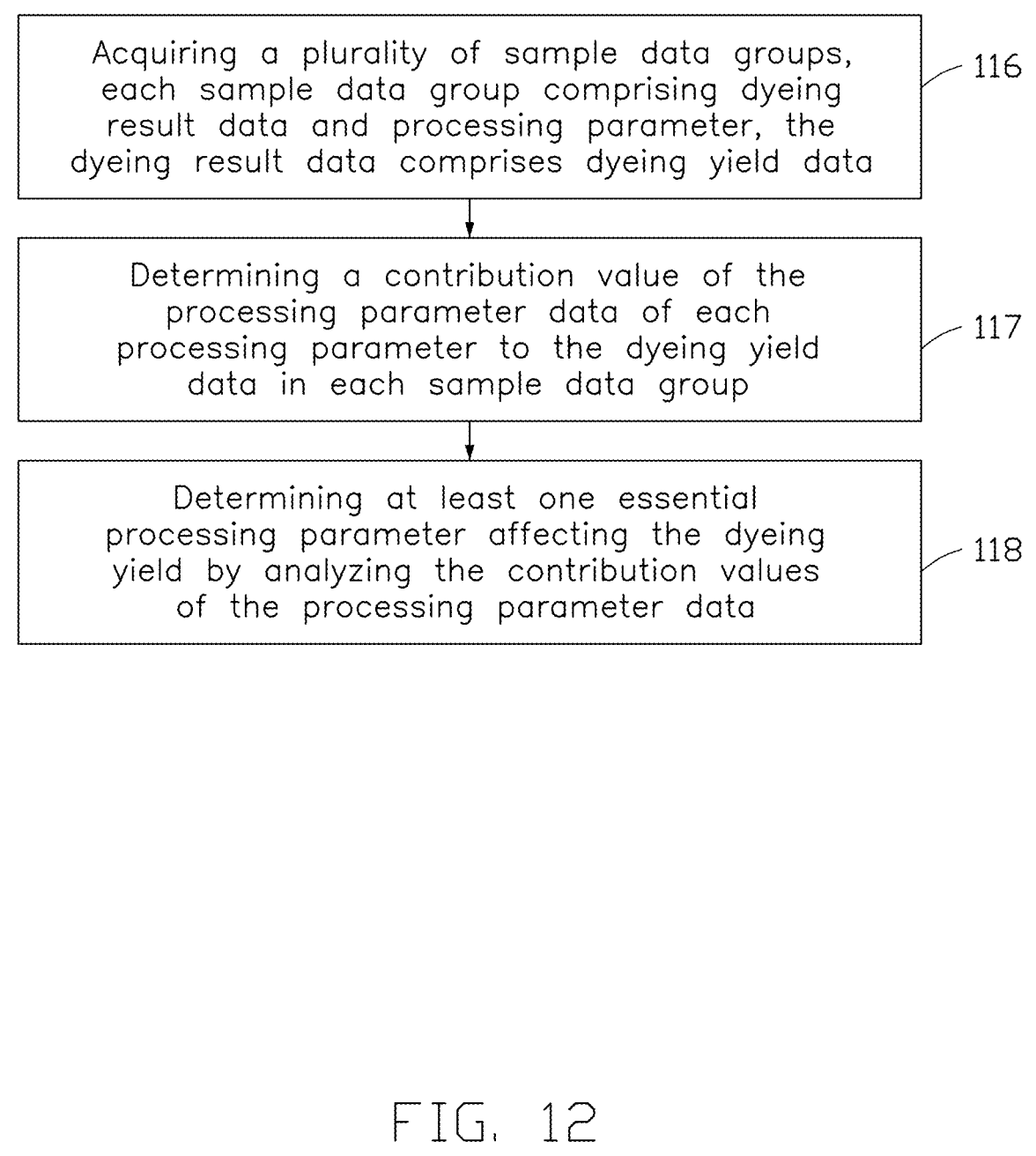

Acquiring a plurality of sample data groups, each sample data group comprising dyeing result data and processing parameter, the dyeing result data comprises dyeing yield data — 116

Determining a contribution value of the processing parameter data of each processing parameter to the dyeing yield data in each sample data group — 117

Determining at least one essential processing parameter affecting the dyeing yield by analyzing the contribution values of the processing parameter data — 118

FIG. 12

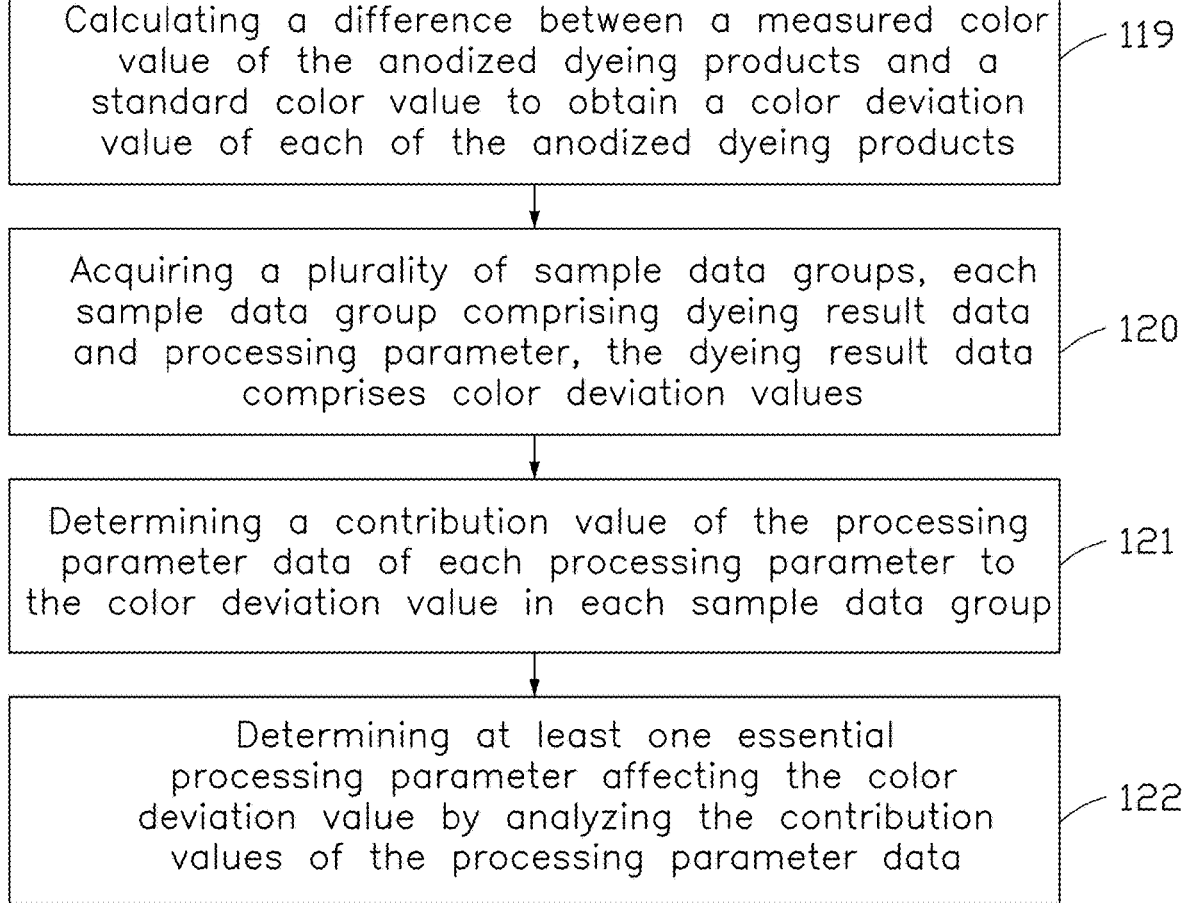

Calculating a difference between a measured color value of the anodized dyeing products and a standard color value to obtain a color deviation value of each of the anodized dyeing products ⟋ 119

Acquiring a plurality of sample data groups, each sample data group comprising dyeing result data and processing parameter, the dyeing result data comprises color deviation values ⟋ 120

Determining a contribution value of the processing parameter data of each processing parameter to the color deviation value in each sample data group ⟋ 121

Determining at least one essential processing parameter affecting the color deviation value by analyzing the contribution values of the processing parameter data ⟋ 122

FIG. 13

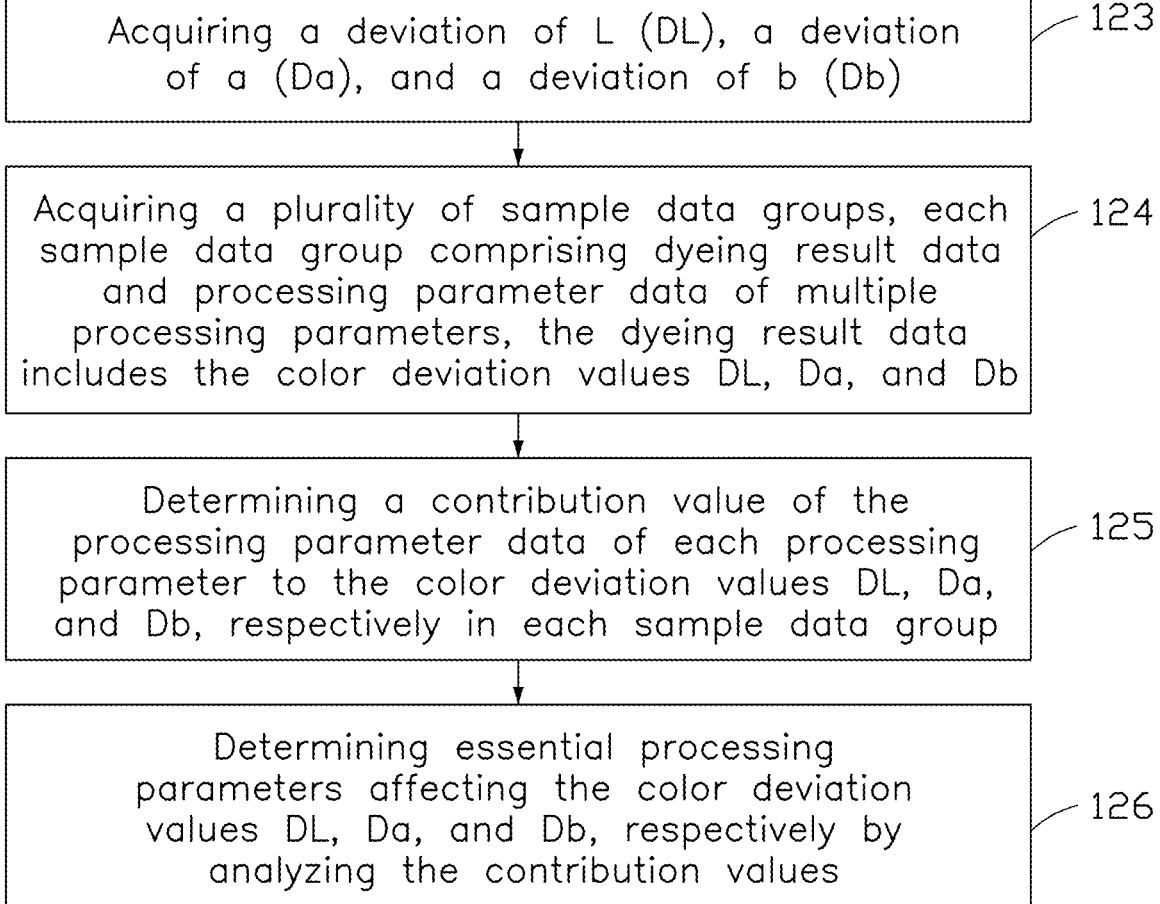

Acquiring a deviation of L (DL), a deviation of a (Da), and a deviation of b (Db) ⌐ 123

Acquiring a plurality of sample data groups, each sample data group comprising dyeing result data and processing parameter data of multiple processing parameters, the dyeing result data includes the color deviation values DL, Da, and Db ⌐ 124

Determining a contribution value of the processing parameter data of each processing parameter to the color deviation values DL, Da, and Db, respectively in each sample data group ⌐ 125

Determining essential processing parameters affecting the color deviation values DL, Da, and Db, respectively by analyzing the contribution values ⌐ 126

FIG. 14

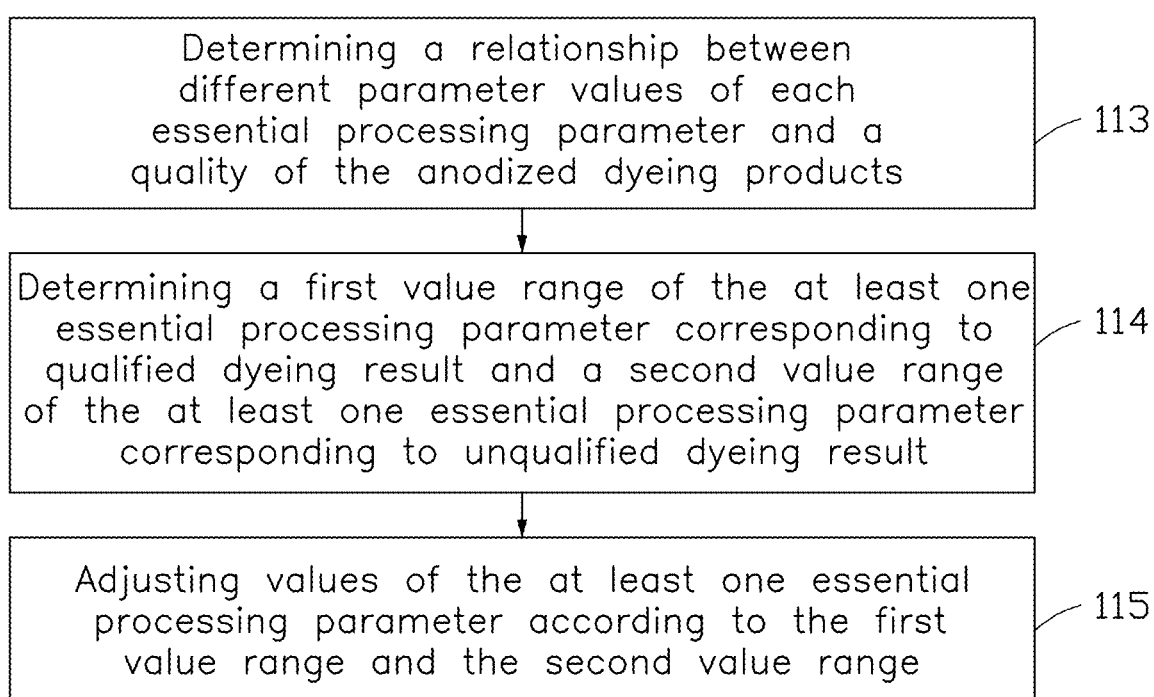

Determining a relationship between different parameter values of each essential processing parameter and a quality of the anodized dyeing products ⟋ 113

Determining a first value range of the at least one essential processing parameter corresponding to qualified dyeing result and a second value range of the at least one essential processing parameter corresponding to unqualified dyeing result ⟋ 114

Adjusting values of the at least one essential processing parameter according to the first value range and the second value range ⟋ 115

FIG. 15

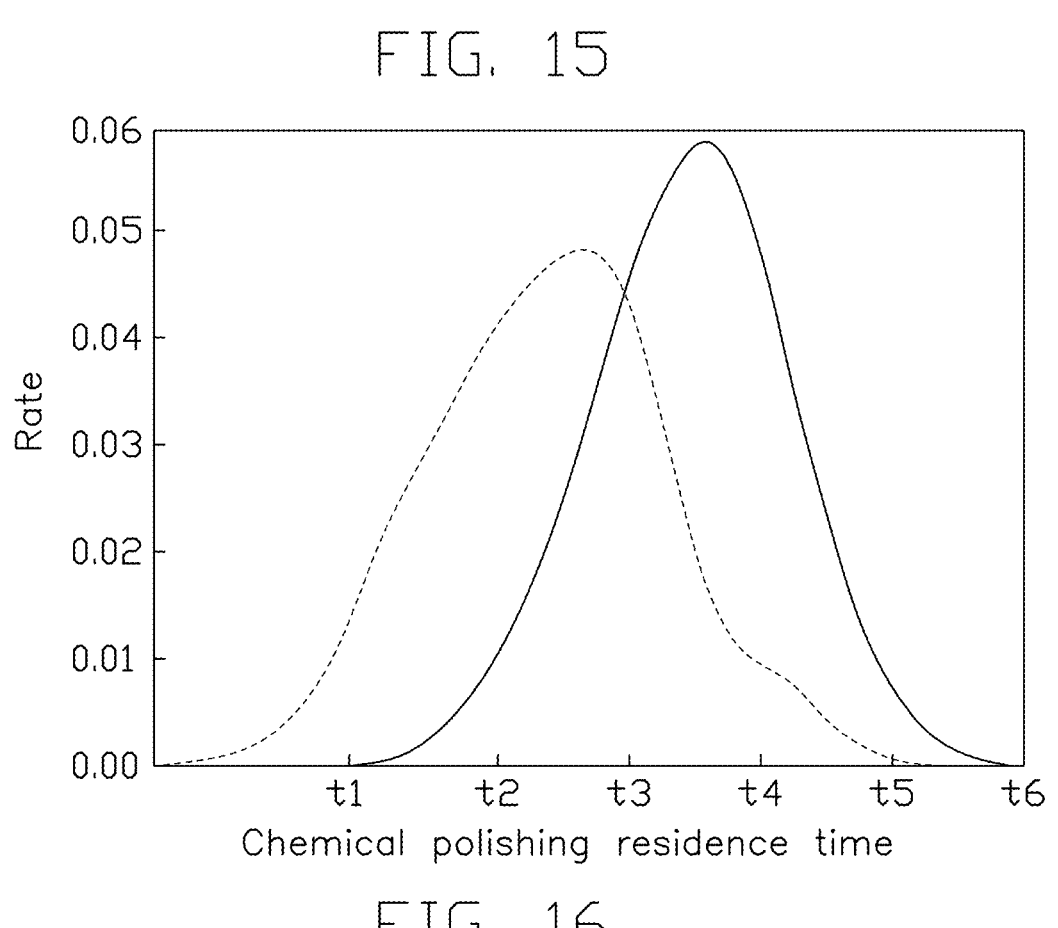

FIG. 16

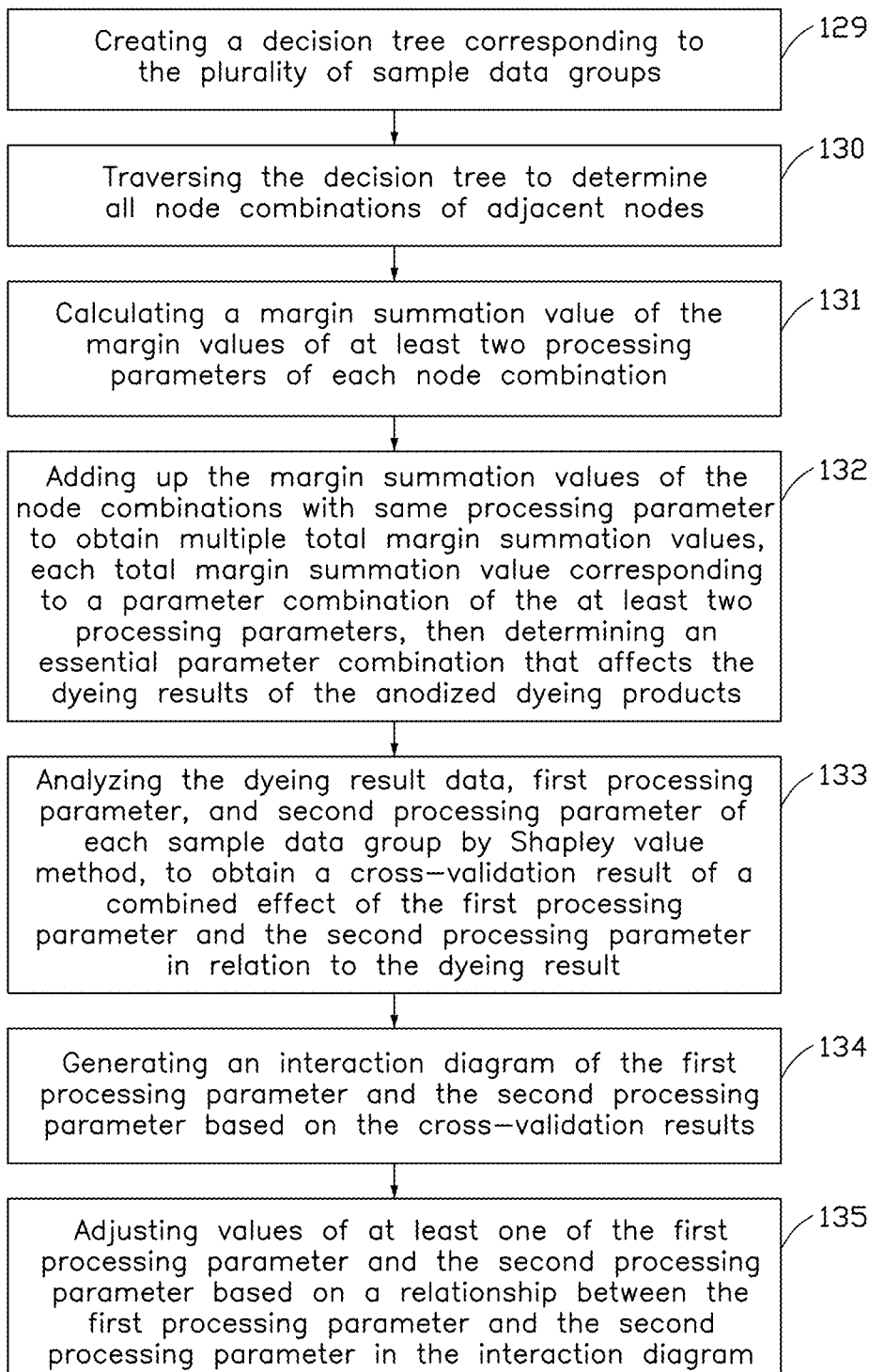

Creating a decision tree corresponding to the plurality of sample data groups ⟋129

Traversing the decision tree to determine all node combinations of adjacent nodes ⟋130

Calculating a margin summation value of the margin values of at least two processing parameters of each node combination ⟋131

Adding up the margin summation values of the node combinations with same processing parameter to obtain multiple total margin summation values, each total margin summation value corresponding to a parameter combination of the at least two processing parameters, then determining an essential parameter combination that affects the dyeing results of the anodized dyeing products ⟋132

Analyzing the dyeing result data, first processing parameter, and second processing parameter of each sample data group by Shapley value method, to obtain a cross-validation result of a combined effect of the first processing parameter and the second processing parameter in relation to the dyeing result ⟋133

Generating an interaction diagram of the first processing parameter and the second processing parameter based on the cross-validation results ⟋134

Adjusting values of at least one of the first processing parameter and the second processing parameter based on a relationship between the first processing parameter and the second processing parameter in the interaction diagram ⟋135

FIG. 17

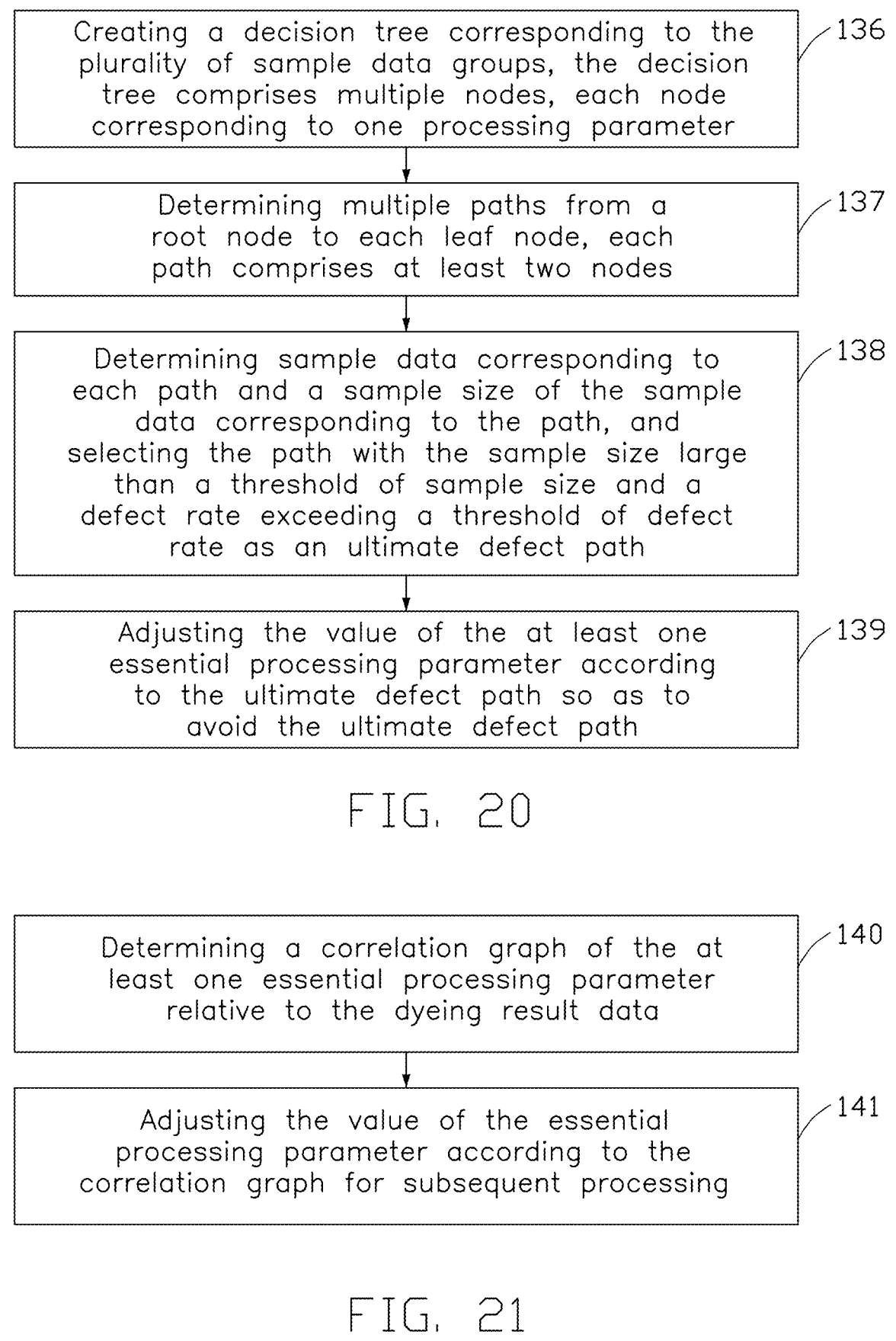

Creating a decision tree corresponding to the plurality of sample data groups, the decision tree comprises multiple nodes, each node corresponding to one processing parameter ⟋136

Determining multiple paths from a root node to each leaf node, each path comprises at least two nodes ⟋137

Determining sample data corresponding to each path and a sample size of the sample data corresponding to the path, and selecting the path with the sample size large than a threshold of sample size and a defect rate exceeding a threshold of defect rate as an ultimate defect path ⟋138

Adjusting the value of the at least one essential processing parameter according to the ultimate defect path so as to avoid the ultimate defect path ⟋139

FIG. 20

Determining a correlation graph of the at least one essential processing parameter relative to the dyeing result data ⟋140

Adjusting the value of the essential processing parameter according to the correlation graph for subsequent processing ⟋141

FIG. 21

DATA ANALYSIS METHOD, COMPUTING DEVICE, AND STORAGE MEDIUM

CROSS-REFERENCE TO RELATED APPLICATIONS

This application claims priority to China Application No. 202111395799.5, having a filing date of Nov. 23, 2021, filed in China State Intellectual Property Administration, the entire contents of which is hereby incorporated by reference.

FIELD

The present disclosure is directed to computing technologies, and in particular, a data analysis method, computing device, and storage medium.

BACKGROUND

Aluminum alloys are widely used in manufacturing, and it is often necessary to anodize and dye the aluminum alloys to improve the wear resistance, material stability, and appearance of the metal products. The anodizing and dyeing process generally includes multiple processes, such as chemical polishing, anodizing, degreasing, soaking, dyeing, etc. Each process involves multiple processing parameters. For example, the process of anodizing comprises at least following parameters: temperature, sulfuric acid concentration, and residence time.

The dyeing results of anodized dyeing products obtained by anodizing and dyeing the aluminum alloys can be affected by various factors. In actual manufacture, the anodized dyeing products are tested and compared to a standard sample to acquire dyeing result data. It is difficult for those skilled in the art to find relationships between the parameters of anodic dyeing process and data of dyeing results.

SUMMARY

An objective of the present disclosure is achieved by providing a data analysis method, a computing device and a storage medium, to determine essential processing parameters affecting dyeing results of anodized dyeing products.

According to a first aspect of the application, a data analysis method is provided, the data analysis method includes: acquiring a plurality of sample data groups, each of the plurality of sample data groups includes dyeing result data and processing parameter data of multiple processing parameters; determining a contribution value of the processing parameter data of each processing parameter to the dyeing result data in each of the plurality of sample data groups; and determining at least one essential processing parameter affecting the dyeing results by analyzing the contribution values of the processing parameter data. The dyeing result data indicates dyeing results of anodized dyeing products and the processing parameter data indicates an anodizing and dyeing process performed on products to be anodized and dyed.

According to a second aspect of the application, a computing device is provided. The computing device includes at least one processor, a memory, and a communicator. The at least one processor is connected to the memory and the communicator. The memory is configured for storing instructions executable by the at least one processor. The communicator is controlled by the at least one processor for communication with the computing device. The instructions are configured to enable the at least one processor to execute the steps of the data analysis method above-mentioned.

According to a third aspect of the application, a computer readable storage medium is provided. The computer readable storage medium stores instructions executable by one or more processors to perform the data analysis method above-mentioned.

BRIEF DESCRIPTION OF THE DRAWINGS

Implementations of the present technology will now be described, by way of example only, with reference to the attached figures.

FIG. 2 is a flow diagram illustrating a data analysis method in accordance with some embodiments of the present application;

FIG. 3 is a flow diagram illustrating a data analysis method in accordance with some embodiments of the present application;

FIG. 4 is a flow diagram illustrating a data analysis method in accordance with some embodiments of the present application;

FIG. 5 is a flow diagram illustrating a data analysis method in accordance with some embodiments of the present application;

FIG. 12 is a flow diagram illustrating a data analysis method in accordance with some embodiments of the present application;

FIG. 13 is a flow diagram illustrating a data analysis method in accordance with some embodiments;

FIG. 14 is a flow diagram illustrating a data analysis method in accordance with some embodiments of the present application;

FIG. 15 is a flow diagram illustrating a data analysis method in accordance with some embodiments of the present application;

FIG. 16 is a diagram illustrating distribution of yield rate relative to chemical polishing time and distribution of defect rate relative to chemical polishing time in accordance with some embodiments of the present application;

3

Figure 18:
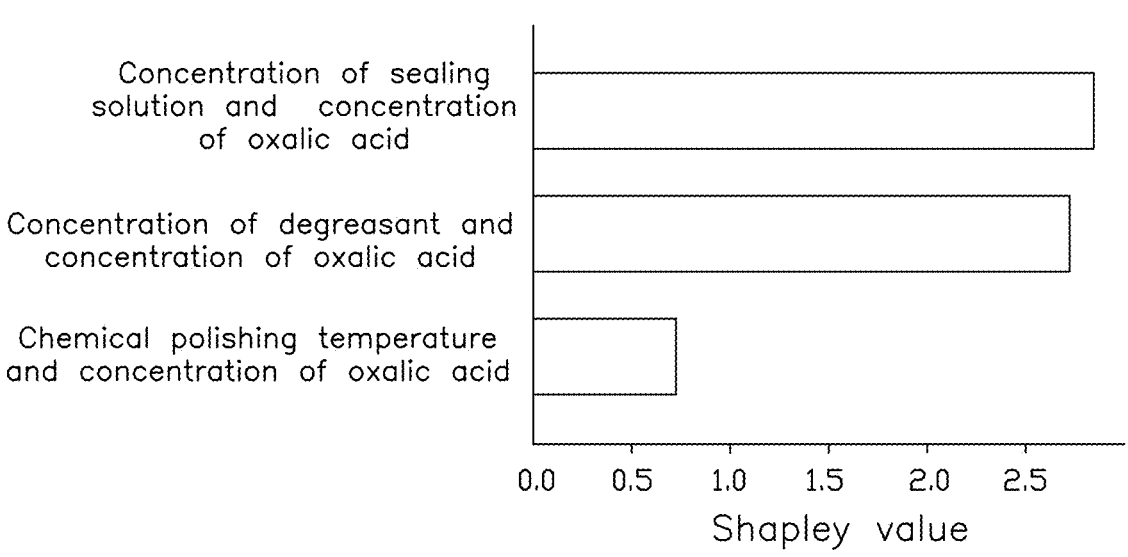
Figure 19:
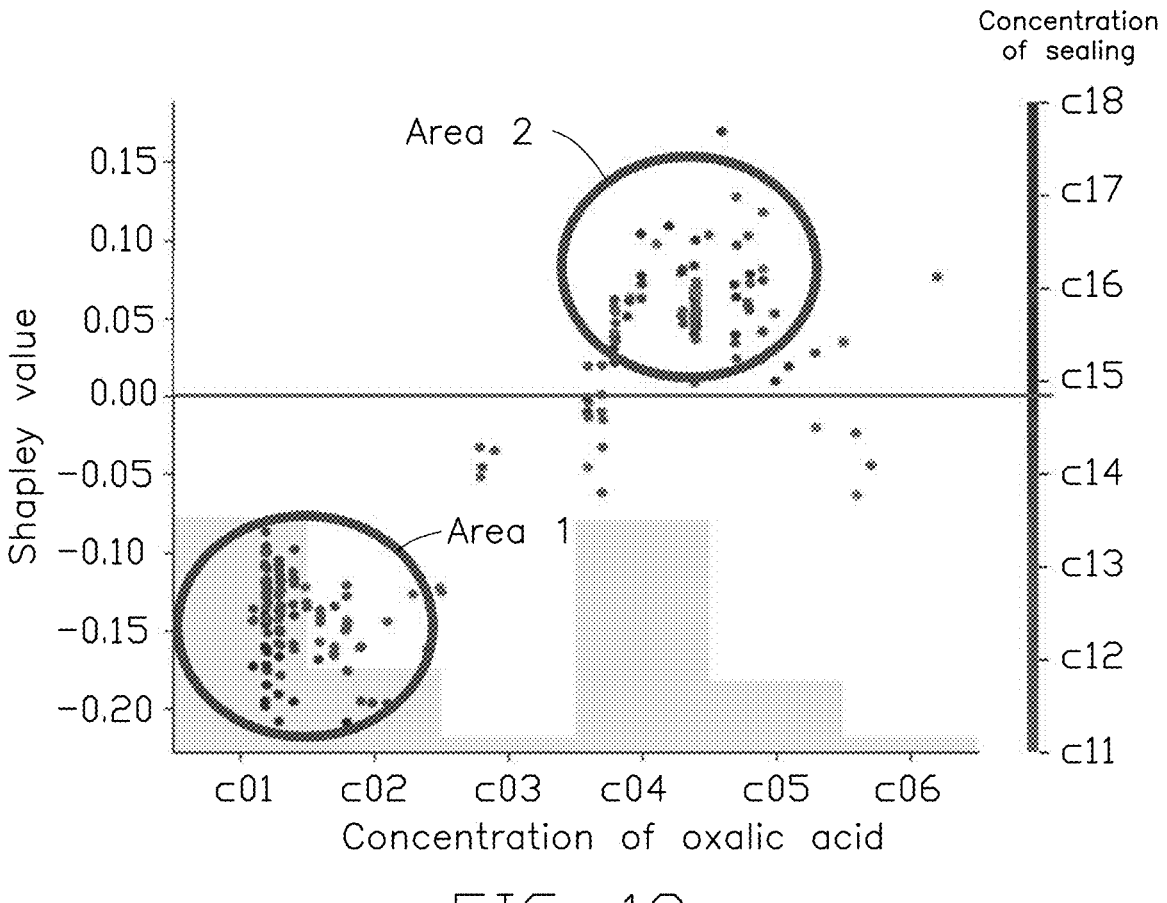
Figure 22:
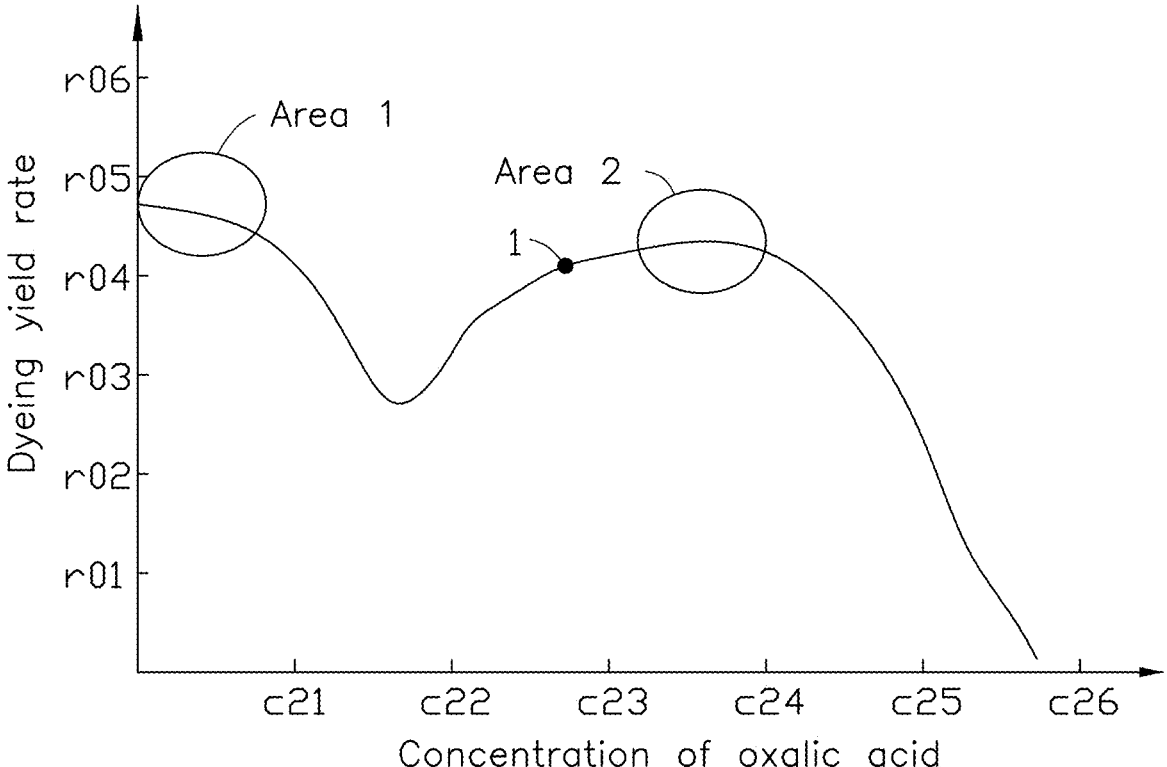
Figure 23:
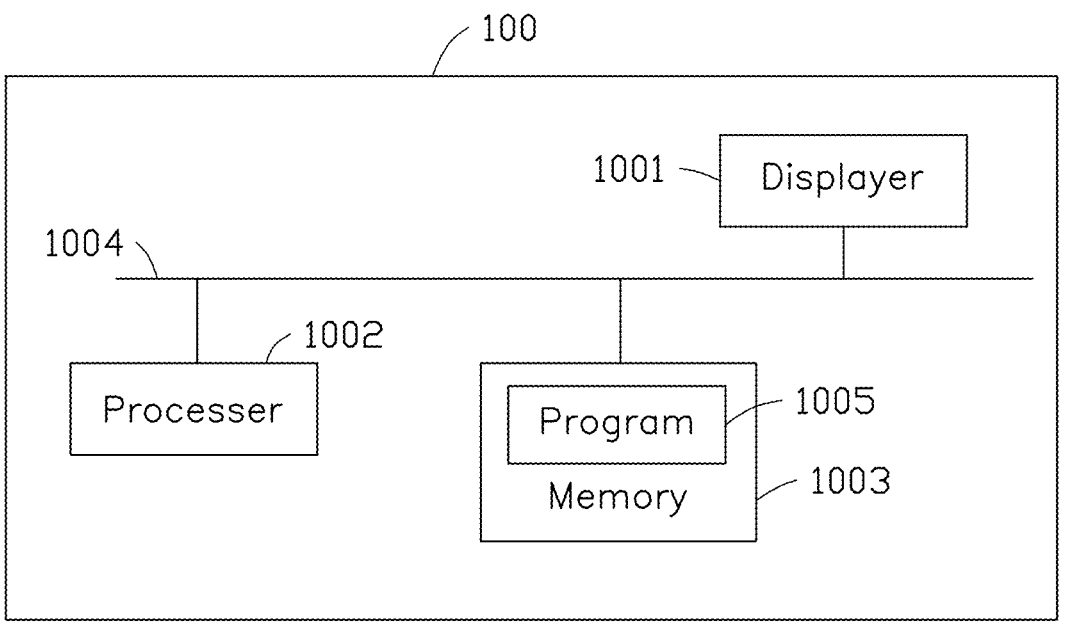

FIG. 17 is a flow diagram illustrating a data analysis method in accordance with some embodiments of the present application;

FIG. 18 is a chart illustrating margin values of combination of the processing parameter of a data analysis method in accordance with some embodiments of the present application;

FIG. 19 is a diagram illustrating an interaction of the concentration of sealing solution and the concentration of oxalic acid in accordance with some embodiments of the present application;

FIG. 20 is a flow diagram illustrating a data analysis method in accordance with some embodiments of the present application;

FIG. 21 is a flow diagram illustrating a data analysis method in accordance with some embodiments of the present application;

FIG. 22 is a correlation graph illustrating the relationship of the concentration of oxalic acid and the yield rate in accordance with some embodiments of the present application;

FIG. 23 is a block diagram illustrating embodiments in accordance with some embodiments of the present application.

DETAILED DESCRIPTION

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

An aspect of the present disclosure provides a data analysis method, the method is integrated in a data processing system, the data processing system includes at least one computing device. The at least one computing device includes a terminal and/or a server. The server can be a local server or a cloud server. The terminal can be a desktop computer, a laptop computer, a smart phone, or a tablet computer. The computing devices are connected to each other by wire or wirelessly.

For example, the data analysis method can be integrated in the terminal, the terminal obtains a plurality of sample data groups, each of the plurality of sample data groups comprising dyeing result data and processing parameter data of multiple processing parameters. The terminal analyses and determines contribution values of each processing parameter data in each sample data group to the dyeing result data, then identifies at least one essential processing parameter affecting the dyeing results by analyzing the contribution values of the processing parameter data.

The hereinafter-described embodiments of the disclosure are presented herein by way of exemplification and not limitation, with reference to the figures.

Figure 1:
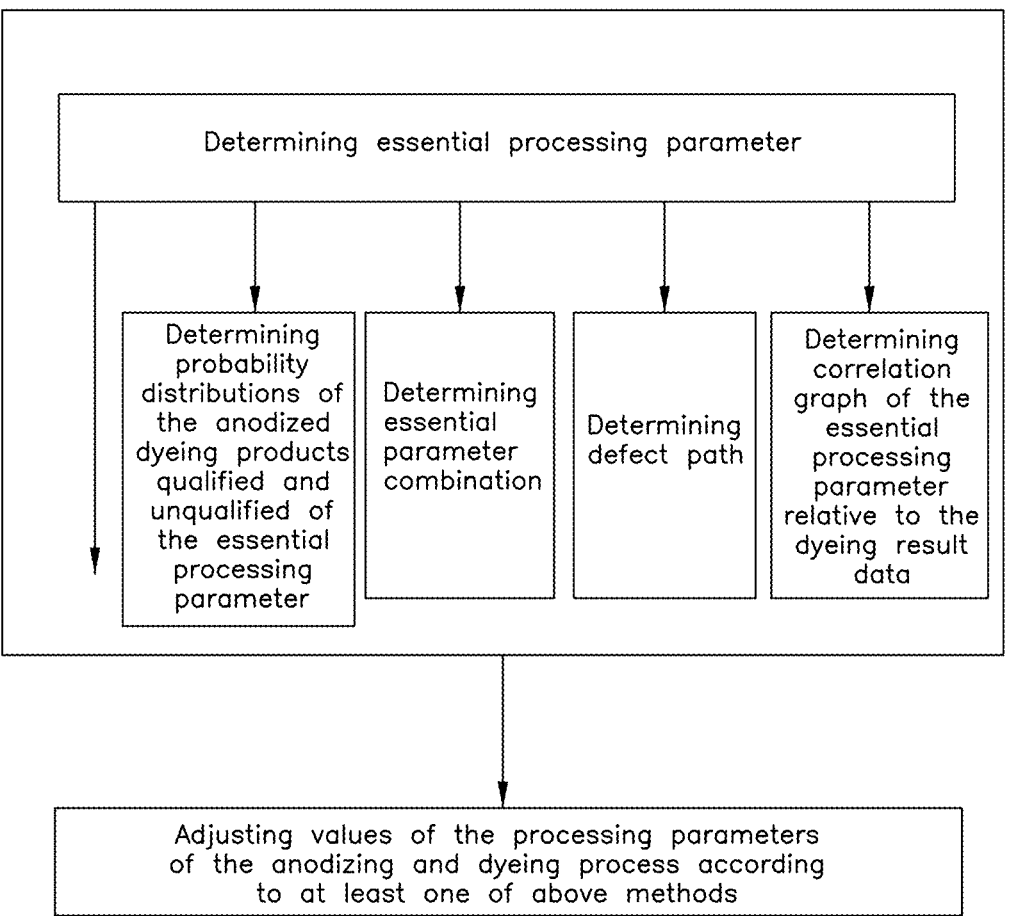
FIG. 1 is a frame diagram illustrating a data analysis method in accordance with some embodiments of the present application.

Referring to FIG. 1, in some embodiments, a contribution value of the processing parameter data of each processing parameter to the dyeing result data in each of the plurality of sample data groups is analyzed firstly, then the contribution values of each processing parameter data in the plurality of sample data groups to the dyeing result data are analyzed, and an essential processing parameter affecting dyeing results is determined.

According to some embodiments, a first value range of the essential processing parameter and a second value range of the essential processing parameter are determined. The first value range of the essential processing parameter is corresponding to qualified dyeing result, the second value range of the essential processing parameter is corresponding to unqualified dyeing result. The first value range is determined according to a probability distribution of the anodized dyeing products qualified of the essential processing parameter. The second value range is determined a probability distribution of the anodized dyeing products unqualified of the essential processing parameter.

Further, at least one essential parameter combination affecting the dyeing results can be determined by analyzing all the processing parameters, all the processing parameters includes the essential processing parameter corresponding to the essential processing parameter data. The essential parameter combination includes at least two processing parameters, and the at least two processing parameters comprise at least one essential processing parameter. In some embodiments, cross-validation is applied to the essential parameter combination to obtain a cross-validation result of the at least two processing parameters.

In some embodiments, an ultimate defect path affecting the dyeing results of the anodized dyeing products is determined according to the plurality of sample data groups, the ultimate defect path includes at least two nodes indicating processing parameters and specific value ranges of each processing parameter.

In some embodiments, a correlation graph of the essential processing parameter relative to the dyeing result data is determined according to the plurality of sample data groups.

According to some embodiments, values of the processing parameters of the anodizing and dyeing process are adjusted according to one or more of the following factors: the at least one essential processing parameter, the probability distribution of the anodized dyeing products qualified of the essential processing parameter, the probability distribution of the anodized dyeing products unqualified of the essential processing parameter, the essential parameter combination including the essential processing parameter, the cross-validation result of the essential parameter combination, the ultimate defect path and the correlation graph of the essential processing parameter relative to the dyeing result data. The adjusted values of the processing parameters can be applied for the subsequent anodizing and dyeing process.

The data analysis method will be described in detail hereinafter.

Referring to FIG. 2, according to some embodiments, the data analysis method can be implemented on a computing device and data analysis method comprises following steps:

S101: acquiring a plurality of sample data groups, each of the plurality of sample data groups includes dyeing result data and processing parameter data of multiple processing parameters, wherein the dyeing result data indicates dyeing results of anodized dyeing products and the processing parameter data indicates an anodizing and dyeing process performed on products to be anodized and dyed.

In some embodiments, the data analysis method can be applied to any industrial process that including at least one process step, products are processed by the at least one process step, for example the industrial process herein can be an anodizing and dyeing process, the anodizing and dyeing process includes at least anodizing process and dyeing process, and the anodizing and dyeing process includes one or more processes of chemical polishing, degreasing, soaking, cleaning, etc., and each process is performed at least one time during the anodizing and dyeing process, for example, both the processes of soaking and cleaning should be performed multiple times. At least one processing parameter is included when each process is performed.

The processing parameter data includes conditions for performing the process and the data thereof. For example, during the anodizing and dyeing process, the processing parameter data for controlling a cleaning process includes cleaning for 30 minutes, the processing parameter data for controlling a sealing process includes a sealing temperature of 20° C. and a sealing time of 15 minutes, the conditions of performing the process are defined as processing parameters, the data corresponding thereto is defined as parameter value. For example, cleaning duration is a processing parameter, 30 minutes is a parameter value, it should be noted that, a sealing temperature of 20° C. and a sealing time of 15 minutes are both processing parameter data.

According to some embodiments, the processing parameter data includes at least one of processing parameter data of chemical polishing, processing parameter data of anodizing process, processing parameter data of dyeing process, processing parameter data of sealing process and processing parameter data of treatment after sealing process. Processing parameters corresponding to the processing parameter data of chemical polishing includes chemical polishing residence time, chemical polishing temperature, and ratio of chemical polishing solution; the processing parameters corresponding to the processing parameter data of anodizing includes oxidation residence time, oxidation temperature, concentration of sulfuric acid, and concentration of oxalic acid; the processing parameters corresponding to processing parameter data of dying includes dyeing temperature, pH value, concentration of grey dyestuff, concentration of blue grey dyestuff, ratio of the grey dyestuff, and dyeing time; the processing parameters corresponding to the processing parameter data of sealing includes residence time of sealing, sealing temperature, and concentration of sealing solution; the processing parameter data of cleaning includes processing parameter data of a first cleaning and a fourth cleaning, wherein the processing parameters corresponding to the processing parameter data of the first cleaning includes a first residence time, a first concentration of cleaning solution and a first cleaning temperature.

According to some embodiments, referring to FIG. 3, the data analysis further includes:

S127: receiving multiple parameter data of the anodized dyeing products relating to dyeing;

S128: removing parameter data unrelated to process results to obtain the processing parameter data of multiple processing parameters, the parameter data that unrelated to process results comprises signs of reaction vessel, starting times of the process and ending times of the process.

Method of identifying a processing parameter includes: receiving multiple parameter data of the anodized dyeing products relating to dyeing, then selecting processing parameter data of multiple processing parameters from the parameter data relating to dyeing. The selecting includes removing parameter data unrelated to process results, such as signs of reaction vessel, starting times and ending times of the process. The removing further includes removing data with a high percentage of incomplete data (such as when ratio of number of processing parameters with missing parameter values to total number of processing parameters exceeds a certain threshold value) and removing data with a high percentage of abnormal data (such as an obviously wrong parameter value, for example a pH value of 20). In addition, the parameter data relating to dyeing can be manually selected by humans (such as process experts) based on experience.

For example, 119 parameter data of the anodized dyeing products relating to the anodizing and dyeing process are received, then parameter data unrelated to process results are removed, such as signs of reaction vessel, starting time and ending time of the process, then 64 parameter data remain. Then removing data with a high percentage of incomplete data or abnormal data, and 36 parameter data remain. Then the 36 parameter data are selected by experienced experts, and 23 parameter data remain. The remaining 23 parameter data of the anodized dyeing products relating to dyeing are determined to be the processing parameter data of sample data.

The anodized dyeing products are obtained by performing the anodizing and dyeing process on products, the dyeing result data of the anodized dyeing products are obtained by testing the anodized dyeing products, the dyeing result data includes data indicating dyeing results of anodized dyeing products.

The dyeing result data includes measured color value obtained by measured color value of the anodized dyeing products, for example, the measured color value are based on CIELAB color space. The CIELAB color space expresses color as three values: L* value stands for the lightness from black (0) to white (100), the a* value stands for degree from green (−) to red (+), and the b* value stands for degree from blue (−) to yellow (+). The color of the anodized dyeing products can thus be expressed by L* value, a* value, and b* value based on CIELAB color space.

According to some embodiments, the dyeing result data includes color deviation value, which includes data obtained from taking an absolute value of a difference between the measured color value and a standard color value. For example, taking an absolute value of differential between the calculated L* value, a* value, and b* value of the anodized dyeing products and the standard L* value, a* value, and b* value respectively, then taking the average of the three absolute values of multiple products respectively, to obtain a deviation of L* (DL), a deviation of a* (Da), and a deviation of b* (Db). The color deviation value of one type can be averaged to obtain averaged deviation value, for example, DL obtained from all measured color value can be averaged to determine average deviation value of L.

According to some embodiments, multiple anodized dyeing products are obtained by performing the anodizing and dyeing process once on multiple products, processing parameter data of these anodized dyeing products are same and the dyeing result data of these anodized dyeing products can be processed by data fusion (such as averaging, summing up, averaging their absolute values and so on) for dyeing result data of this batch of anodized dyeing products corresponding to this anodizing and dyeing process, which can be regarded as dyeing result data of sample data, and the processing parameter data of this anodizing and dyeing process can be regarded as processing parameter data of sample data.

In some embodiments, the dyeing result data includes yield rate and/or defect rate of measured color data (that is, yield rate of dyeing or defect rate of dyeing), the yield rate of measured color value in one sample data group includes yield rate of the anodized dyeing products obtained by this anodizing and dyeing process. Specifically, the yield rate is acquired by following steps: acquiring measured color data of each anodizing and dyeing product obtained by one anodizing and dyeing process; determining each product to be qualified or unqualified (such as whether the difference between the measured color data and standard color value is within a threshold value, if the difference is within the threshold value, the product is determined as qualified, otherwise unqualified); calculating yield rate or defect rate of all anodizing and dyeing products obtained by this anodizing and dyeing process (for example, yield rate refers to ratio of number of all qualified products to number of all anodizing and dyeing products obtained), the yield rate or defect rate is regarded as yield rate or defect rate of a measured color data of a sample data group, and the average of yield rate data and defect data of all measured color data is regarded as an average yield rate data and an average defect data.

Referring to FIG. 2 and FIG. 4, according to some embodiments, the data analysis method includes:

S102: determining a contribution value of the processing parameter data of each processing parameter to the dyeing result data in each of the plurality of sample data groups.

In particular, the contribution value includes data indicating a contribution of the processing parameter data to the dyeing result data, and there are multiple ways to determine the contribution values, for example, referring to FIG. 4, in some embodiments, the data analysis method further includes:

S101': acquiring a plurality of sample data groups, each of the plurality of sample data groups comprising dyeing result data and processing parameter data of multiple processing parameters, wherein the dyeing result data indicates dyeing results of anodized dyeing products and the processing parameter data indicates an anodizing and dyeing process performed on products to be anodized and dyed;

S110: determining a contribution value of the processing parameter data of each processing parameter to the dyeing result data in one of the sample data groups by Shapley value method;

S103': determining at least one essential processing parameter affecting the dyeing results by analyzing the contribution values of the processing parameter data.

Contribution values of each processing parameter data to the dyeing result data can be determined by Shapley value method. For example, sample data 1 includes processing parameter data 1, processing parameter data 2, processing parameter data 3 of the anodizing and dyeing process performed on an anodized dyeing products 1, and dyeing result data 1 of the anodized dyeing products 1. Individual contribution values of each processing parameter data can be acquired by a local computer or other computers remotely, that is, an individual contribution value 1 regarding the processing parameter data 1 to the dyeing result data 1, an individual contribution value 2 regarding the processing parameter data 2 to the dyeing result data 1, and an individual contribution value 3 regarding the processing parameter data 3 to the dyeing result data 1.

Then a mixed contribution value 4 regarding contributions of the processing parameter data 1 and 2 to the dyeing result data 1, a mixed contribution value 5 regarding contributions of the processing parameter data 1 and 3 to the dyeing result data 1, and a mixed contribution value 6 regarding contributions of the processing parameter data 2 and 3 to the dyeing result data 1 can be determined. Based on the six contribution values, in circumstances that the processing parameter data 1, 2, and 3 work together, the contribution value of the processing parameter data 1, 2, and 3 to the dyeing result data 1 can be determined respectively.

S103: determining at least one essential processing parameter affecting the dyeing results by analyzing the contribution values of the processing parameter data.

Further, the contribution value of each processing parameter data is acquired by processing each sample data group, then multiple contribution values of each processing parameter data can be obtained by determining contribution values of each processing parameter data in different sets of sample data.

The contribution value of each processing parameter data can be analyzed by various methods, such as performing data fusion on the contribution value of each processing parameter data to obtain a fusion contribution value. Data fusion includes but is not limited to summation, averaging, and so on, the fusion contribution values obtained accordingly are summation contribution values, contribution averaging values, and so on. Then selecting the multiple processing parameters according to the fusion contribution values to determine at least one essential processing parameter affecting the dyeing result, for example, ranking the fusion contribution values by numerical value and taking the first N (N is a positive integer) processing parameters as the essential processing parameters.

Referring to FIG. 5, In some embodiments, the data analysis method further includes:

S101': acquiring a plurality of sample data groups, each of the plurality of sample data groups comprising dyeing result data and processing parameter data of multiple processing parameters, wherein the dyeing result data indicates dyeing results of anodized dyeing products and the processing parameter data indicates an anodizing and dyeing process performed on products to be anodized and dyed;

S111: determining a first contribution value and a second contribution value of the processing parameter data of each processing parameter to the dyeing result parameters in each of the plurality of sample data groups based on a first algorithm model and a second algorithm model;

S112: performing data fusion on the first contribution value and the second contribution value of the processing parameter data of each processing parameter of the plurality of sample data groups to determine at least one essential processing parameter affecting the dyeing results.

The contribution value of each processing parameter data to the dyeing result data in each sample data group can be respectively calculated by more than one algorithm (such as the first algorithm model and the second algorithm model), then each the processing parameter data in each sample data group will have more than one corresponding contribution value (such as the first contribution value and the second contribution value), then performing data fusion on the contribution values for each the processing parameter data in each sample data group, and performing data fusion on the fusion contribution values to obtain the summation contribution values and/or contribution averaging values. In other embodiments, data fusion is performed directly on all contribution values of each the processing parameter data (such as all of the first contribution values and the second contribution values) to obtain the summation contribution values and/or contribution averaging values. After that, at least one essential processing parameter affecting the dyeing result can be determined.

Figure 6:
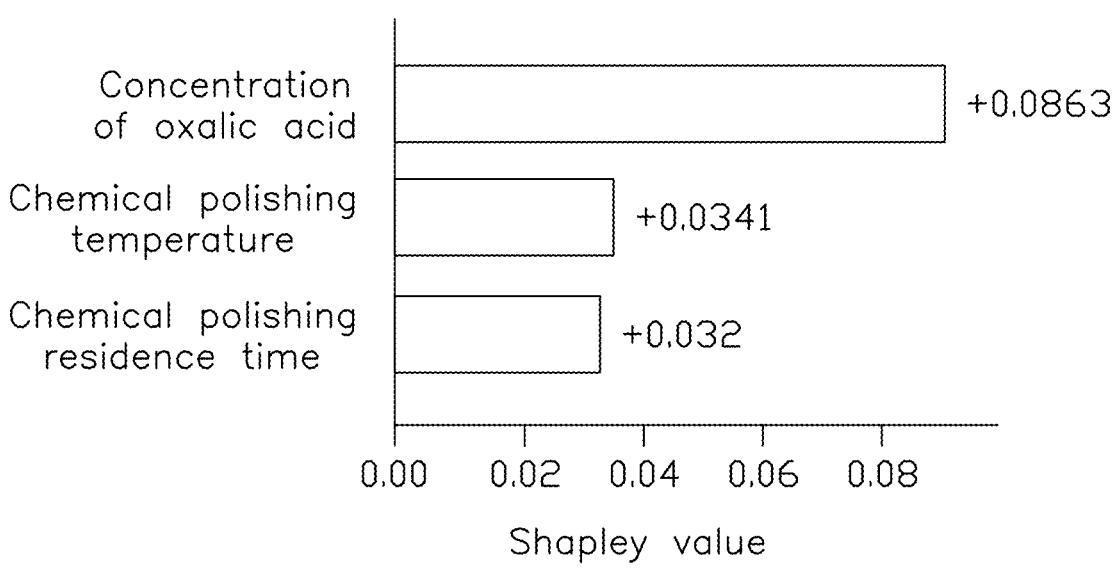
FIG. 6 is a chart illustrating the contribution values of the processing parameter data to averaged DL data in the data analysis method in accordance with some embodiments of the present application.

Referring to FIG. 6, according to some embodiments, the averaging of contribution values of multiple processing parameters data are shown in the chart. The averaging contribution values here indicate the contributions of the processing parameters data to the average deviation value of L*, a larger average deviation value of L* indicates a poorer quality of dyeing, therefore, a larger averaging contribution value means that the corresponding processing parameter has a greater negative effect on dyeing. For example, in FIG. 6, the averaging contribution value of the concentration of oxalic acid is greater than others, that is, the concentration of oxalic acid has the greatest negative effect on dyeing. It should be noted that, the concentration of oxalic acid here refers to the concentration of oxalic acid in the electrolyte used in anodizing.

Figure 7:
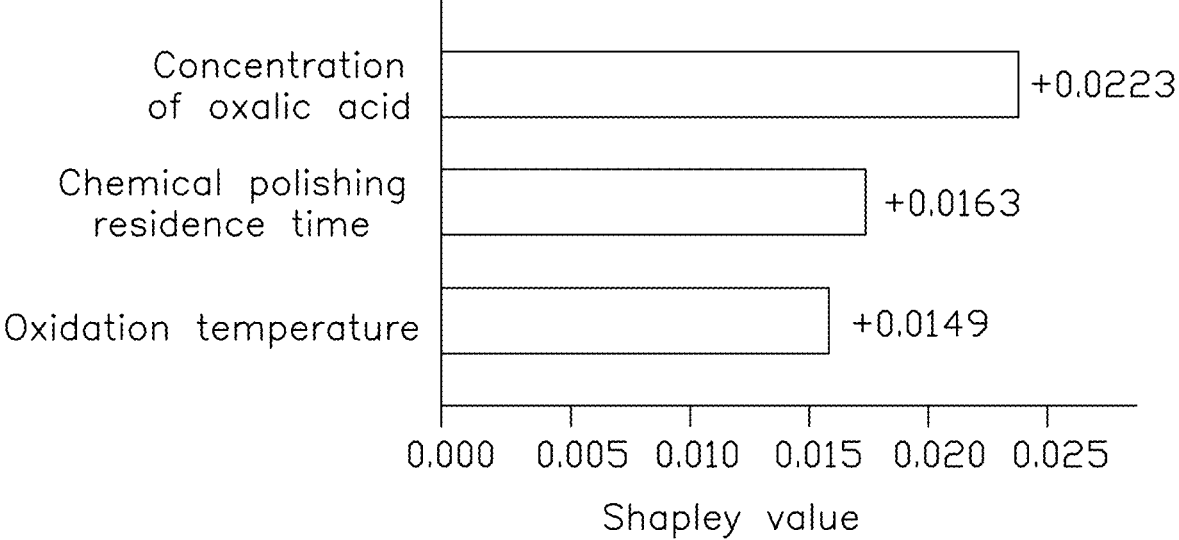
FIG. 7 is a chart illustrating the contribution values of the processing parameter data to averaged Da data in the data analysis method in accordance with some embodiments of the present application.

Referring to FIG. 7, according to some embodiments, averaging contribution values of multiple of processing parameters data are shown in the chart. The averaging contribution value here indicates the contribution of the processing parameters data to the average deviation of the a*, a larger average deviation of a indicates a poorer quality of dyeing, therefore, a larger averaging contribution value means that the corresponding processing parameter has a larger negative effect on dyeing. For example, in FIG. 7, the averaging contribution value of concentration of oxalic acid is greater than others, that is, the concentration of oxalic acid has the greatest negative effect on dyeing.

Figure 8:
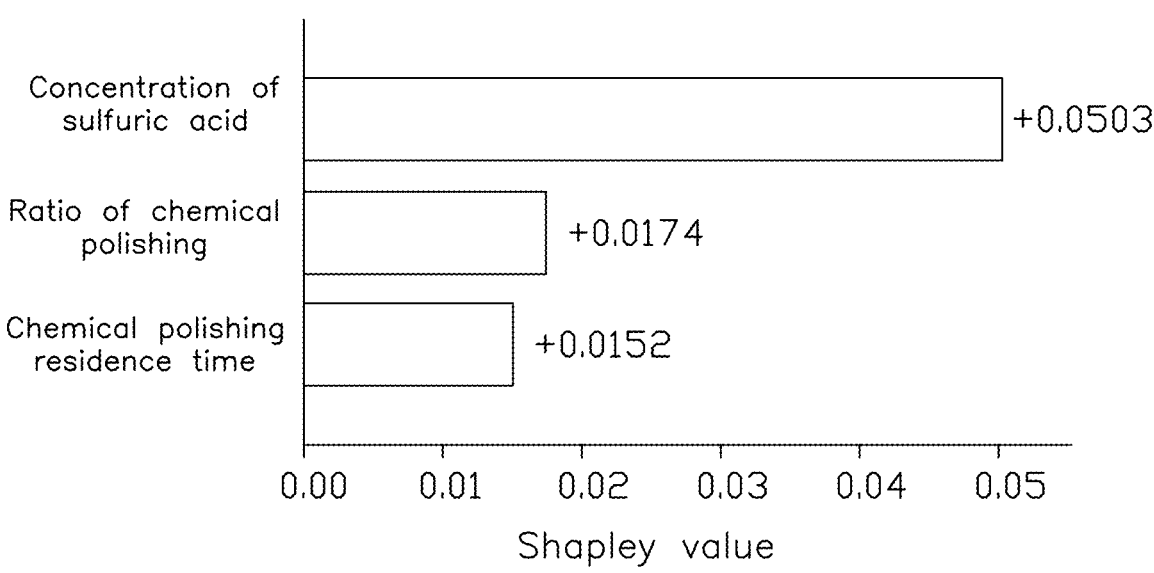
FIG. 8 is a chart illustrating the contribution values of the processing parameter data to averaged Db data in the data analysis method in accordance with some embodiments of the present application.

Referring to FIG. 8, according to some embodiments, averaging contribution values of multiple of processing parameters data are shown in the chart. The averaging contribution value here indicates the contribution of the processing parameters data to the average deviation of the b*, a larger average deviation of b* indicates a poorer quality of dyeing, therefore, a larger averaging contribution value means that the corresponding processing parameter has a greater negative effect on dyeing. For example, in FIG. 8, the averaging contribution value of concentration of sulfuric acid is bigger than others, that is, the concentration of sulfuric acid has the greatest negative effect on dyeing. It should be noted that, the concentration of sulfuric acid here refers to the concentration of sulfuric acid in the electrolyte used in anodizing.

Figure 9:
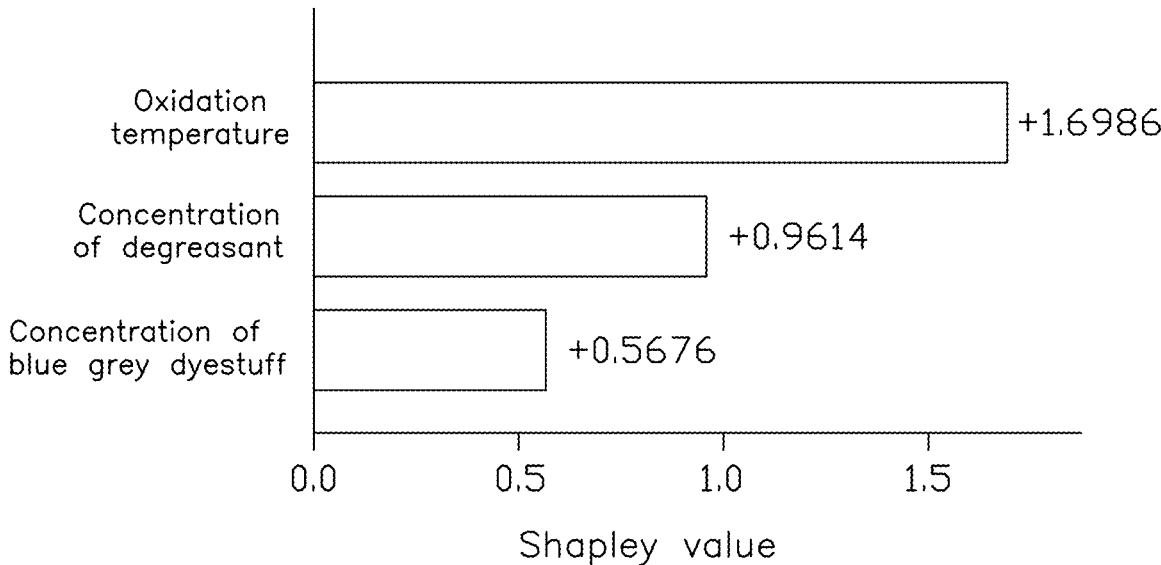
FIG. 9 is a chart illustrating the contribution values of the processing parameter data to yield rate of L* in the data analysis method in accordance with some embodiments of the present application.

Referring to FIG. 9, according to some embodiments, averaging contribution values of multiple processing parameters data are shown in the chart. The averaging contribution value here indicates the contribution of the processing parameters data to the yield rate of L* of the anodized dyeing products, a higher yield rate indicates a better quality of dyeing, therefore, a larger averaging contribution value means that the corresponding processing parameter has a bigger positive effect on dyeing. For example, in FIG. 9, the averaging contribution value of oxidation time is bigger than others, that is, the oxidation time has the biggest positive effect on yield rate of L* of the anodized dyeing products.

Figure 10:
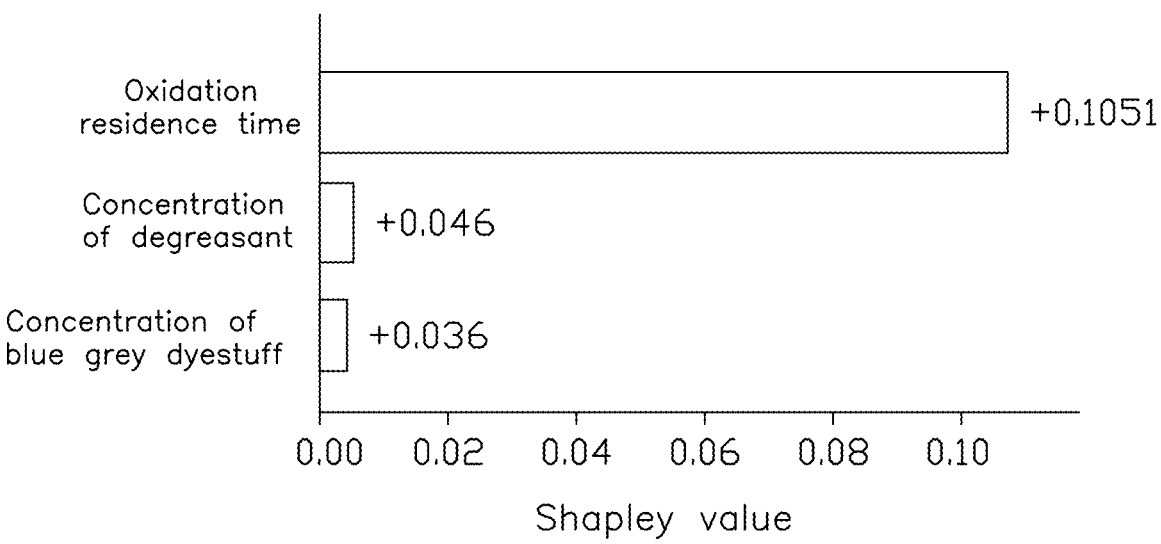
FIG. 10 is a chart illustrating the contribution values of the processing parameter data to yield rate of a* in the data analysis method in accordance with some embodiments of the present application.

Referring to FIG. 10, according to some embodiments, averaging contribution values of multiple processing parameters data are shown in the chart. The averaging contribution value here indicates the contribution of the processing parameters data to the yield rate of the a* of the anodized dyeing products, a higher yield rate indicates a better quality of dyeing, therefore, a larger averaging contribution value means that the corresponding processing parameter has a bigger positive effect on dyeing. For example, in FIG. 10, the averaging contribution value of oxidation residence time is bigger than others, that is, the oxidation residence time has the biggest positive effect on yield rate of the a* of the anodized dyeing products.

Figure 11:
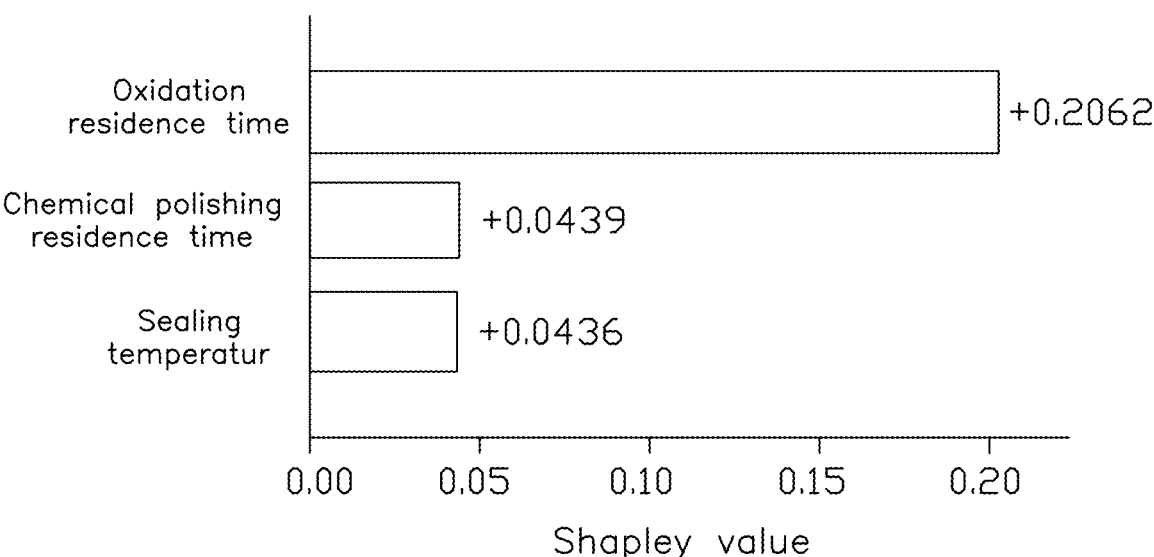
FIG. 11 is a chart illustrating the contribution values of the processing parameter data to yield rate of b* in the data analysis method in accordance with some embodiments of the present application.

Referring to FIG. 11, according to some embodiments, averaging contribution values of multiple processing parameters data are shown in the chart. The averaging contribution values here indicate the contribution of the processing parameters data to the yield rate of the b* of the anodized dyeing products, a higher yield rate indicates a better quality of dyeing, therefore, a larger averaging contribution value means that the corresponding processing parameter has a bigger positive effect on dyeing. For example, in FIG. 11, the averaging contribution value of oxidation time is bigger than others, that is, the oxidation time has the biggest positive effect on yield rate of the b* of the anodized dyeing products.

Defect rate can be analyzed in a way similar to the principle and method of the yield rate and will not be repeated here.

Referring to FIG. 12, in some embodiments, the dyeing result data includes yield rate, and the data analysis method includes:

S116: acquiring a plurality of sample data groups, each of the plurality of sample data groups comprising dyeing result data and processing parameter data of multiple processing parameters, wherein the dyeing result data indicates dyeing results of anodized dyeing products and the processing parameter data indicates an anodizing and dyeing process performed on products to be anodized and dyed, the dyeing result data comprises dyeing yield data;

S117: determining a contribution value of the processing parameter data of each processing parameter to the dyeing yield data in each of the plurality of sample data groups.

S118: determining at least one essential processing parameter affecting the dyeing yield by analyzing the contribution values of the processing parameter data.

Specifically, determining contribution values of each the processing parameter data to the yield rate in each sample data group, then analyzing the contribution values obtained in multiple sets of sample data to determine at least one essential processing parameter. Such analysis may include averaging the multiple contribution values of each the processing parameter data for obtaining an average contribution value of each the processing parameter data, then the processing parameter corresponding to average contribution value which exceeds a predetermined threshold value is determined as an essential processing parameter, that is the essential processing parameter has a large negative effect on the yield rate.

Referring to FIG. 13, in some embodiments, the dyeing result data includes color deviation value, and the data analysis method includes:

S119: calculating a difference between a measured color value of the anodized dyeing products and a standard color value to obtain a color deviation value of each of the anodized dyeing products;

S120: acquiring a plurality of sample data groups, each of the plurality of sample data groups comprising dyeing result data and processing parameter data of multiple processing parameters, the dyeing result data indicates dyeing results of anodized dyeing products and the processing parameter data indicates an anodizing and dyeing process performed on products to be anodized and dyed, the dyeing result data comprises color deviation values;

S121: determining a contribution value of the processing parameter data of each processing parameter to the color deviation value in each of the plurality of sample data groups;

S122: determining at least one essential processing parameter affecting the color deviation value by analyzing the contribution values of the processing parameter data; the color deviation values include DL, Da, and Db. An average deviation value of L*, a*, and b* can be obtained by averaging the absolute value of DL, Da, and Db, respectively.

Referring to FIG. 14, in some embodiments, the data analysis further includes:

S123: calculating a difference between the L* value and a standard L* value, calculating a difference between the a* value and a standard a* value, calculating a difference between the b* value and a standard b* value, to acquire the DL, the Da, and the Db, respectively;

S124: acquiring a plurality of sample data groups, each of the plurality of sample data groups comprising dyeing result data and processing parameter data of multiple processing parameters, the dyeing result data indicates dyeing results of anodized dyeing products and the processing parameter data indicates an anodizing and dyeing process performed on products to be anodized and dyed, the dyeing result data includes the color deviation values DL, Da, and Db;

S125: determining a contribution value of the processing parameter data of each processing parameter to the color deviation values DL, Da, and Db, respectively in each of the plurality of sample data groups.

S126: determining essential processing parameters affecting the color deviation values DL, Da, and Db, respectively by analyzing the contribution values of the processing parameter data to the color deviation values DL, Da, and Db. For each sample data group, a contribution value of the processing parameter data of each processing parameter to the color deviation values DL, Da, and Db is determined respectively, then added them up respectively for a summation contribution value of L*, a summation contribution value of a*, and a summation contribution value of b* for each processing parameter.

The summation contribution values of L*, the summation contribution values of a*, and the summation contribution values of b* are ranked by numerical value the first N (N is a positive integer) processing parameters of each sequence are respectively taken as the essential processing parameters of DL, Da, and Db. As a larger color deviation value indicates a poorer quality of dyeing, it is obvious that the essential processing parameters have a very negative effect on dyeing in relation to the L*, the a*, and the b*.

In some embodiments, averaging sum of the contribution values of each processing parameter data to DL, Da, and Db, then ranking the average contribution values of L*, the average contribution values of a*, and the average contribution values of b* by numerical value, and taking the first N (N is a positive integer) processing parameters of each sequence as the respective essential processing parameters of DL, Da, and Db.

Referring to FIG. 15, in some embodiments, the data analysis further includes:

S113: determining a relationship between different parameter values of each essential processing parameter and a quality of the anodized dyeing products by a probability distribution of the anodized dyeing products qualified corresponding to each processing parameter and a probability distribution of the anodized dyeing products unqualified corresponding to each essential processing parameter; wherein the probability distribution of the anodized dyeing products qualified and the probability distribution of the anodized dyeing products unqualified are generated by kernel density estimation, according to the dyeing result data and essential processing parameter data corresponding to each essential processing parameter of the plurality of sample data groups;

S114: determining a first value range of the at least one essential processing parameter corresponding to qualified dyeing result and a second value range of the at least one essential processing parameter corresponding to unqualified dyeing result, wherein the first value range is determined according to the probability distribution of the anodized dyeing products qualified of the at least one essential processing parameter and the second value range is determined the probability distribution of the anodized dyeing products unqualified of the at least one essential processing parameter, respectively;

S115: adjusting values of the at least one essential processing parameter according to the first value range and the second value range; and the adjusted parameters can be applied for subsequent anodizing and dyeing process.

The probability distribution of the anodized dyeing products qualified relative to each essential processing parameter and the probability distribution of the anodized dyeing products unqualified relative to each essential processing parameter can be generated according to essential processing parameter data corresponding to the essential processing parameter and dyeing result data of in the plurality of sample data groups.

The probability distributions can be generated by many ways, such as by kernel density estimation. Specifically, and firstly, determining the dyeing result data to be qualified or unqualified according to the dyeing result data of the sample data, and collecting the parameter values of multiple essential processing parameters corresponding to qualified and unqualified dyeing result, then determining referential curves of parameter values corresponding to qualified dyeing result and referential curves of parameter values corresponding to unqualified dyeing result according to the predetermined bandwidth and kernel function. Then, acquiring a probability distributions curve of yield rate and a probability distributions curve of defect rate by performing summing up and normalization on the referential curves, wherein the bandwidth is determined by error functions, such as square-integrable error function. The kernel function includes at least one of Gaussian kernel, uniform kernel, triangular kernel, biweight kernel, triweight kernel, Epanechnikov kernel, and normal kernel.

For example, the parameter values of the essential processing parameter 1 corresponding to qualified dyeing result are processed by Gaussian kernel function based on a predetermined bandwidth h=2, to obtain Gaussian curves of each parameter value, then the Gaussian curves are summed and normalized for a probability distribution curve of yield rate relative to the essential processing parameter 1.

A first value range of the essential processing parameter corresponding to qualified dyeing result and a second value range of the essential processing parameter corresponding to unqualified dyeing result can be determined according to the probability distribution of the anodized dyeing products qualified of the essential processing parameter and the probability distribution of the anodized dyeing products unqualified of the essential processing parameter, respectively, then the values of essential processing parameters can be adjusted according to first value range and the second value range. All essential processing parameter values can be adjusted to avoid value ranges corresponding to unqualified dyeing result, and the anodic dyeing process can be performed according to the adjusted processing parameters.

Referring to FIG. 16, in some embodiments, the dash line represents a probability distribution of the anodized dyeing products qualified relative to the chemical polishing time, and it shows that probability of unqualified dyeing result is higher than 4% when the chemical polishing time ranges from 'ta' to 'tb' ('ta'<'tb'); the solid line represents a probability distribution of the anodized dyeing products qualified relative to the chemical polishing time, and it shows that probability of qualified dyeing result is higher than 4% when the chemical polishing time ranges from 'tc' to 'td' ('tc'<'tb', 'tc'<'td'). Therefore, the parameter value of the essential processing parameter 1 should be adjusted from 'm' to 'n' ('n' is in the range of 'tc' to 'td' and is out of the range of 'ta' to 'tb').

In some embodiments, based on all the sample data, a decision tree can be established by algorithm such as Classification and Regression Tree (CART), Conditional Inference (Trees), iterative Dichotomiser 3 (ID3), Extreme Gradient Boosting, XGBoost, and so on.

Referring to FIG. 17, the data analysis method further includes:

S129: creating a decision tree corresponding to the plurality of sample data groups, wherein the decision tree comprises multiple nodes, each node corresponding to one processing parameter and the margin value of the processing parameter;

S130: traversing the decision tree to determine all node combinations of adjacent nodes;

S131: calculating a margin summation value of the margin values of at least two processing parameters of each node combination, wherein the at least two processing parameters comprises at least one essential processing parameter.

S132: adding up the margin summation values of the node combinations with same processing parameter to obtain multiple total margin summation values, each total margin summation value corresponding to a parameter combination of the at least two processing parameters, then determining an essential parameter combination that affects the dyeing results of the anodized dyeing products.

S133: analyzing the dyeing result data, first processing parameter data of the first processing parameter, and second processing parameter data of the second processing parameter of each of the plurality of sample data groups by Shapley value method, to obtain a cross-validation result of a combined effect of the first processing parameter and the second processing parameter in relation to the dyeing result.

S134: generating an interaction diagram of the first processing parameter and the second processing parameter based on the cross-validation result of the first processing parameter and the second processing parameter;

S135: adjusting values of at least one of the first processing parameter and the second processing parameter based on a relationship between the first processing parameter and the second processing parameter in the interaction diagram, and the adjusted parameters can be applied for subsequent anodic and dyeing processes accordingly.

Calculating a margin summation value of the margin values of at least two processing parameters of each node combination for a margin summation value, then adding up the margin summation value of node combinations with same processing parameter for multiple total margin summation values, each total margin summation value corresponding to a parameter combination of at least two processing parameters, the parameter combination includes at least one essential processing parameter, then an essential processing parameter combination can be determined from the multiple parameter combination based on the total margin summation values, the way of determining the essential processing parameter combination can be taken as the processing parameter combination with a total margin summation value exceeding a predetermined value, and so on.

Referring to FIG. 18, in some embodiments, the total margin summation values of multiple parameter combinations are shown, each parameter combination includes two processing parameters, as shown in the figure, the parameter combination of the concentration of sealing solution and the concentration of oxalic acid has the highest total margin summation value, that means that the concentration of sealing solution and the concentration of oxalic acid have biggest combined effect on the dyeing result. Specifically, that means that when considering influence of the concentration of oxalic acid on the dyeing result, the influence of the concentration of sealing solution should be considered with it.

To further determine how essential parameter combinations work to have an effect on anodized dyeing products, assume that the essential parameter combination includes a first processing parameter and a second processing parameter, then analyze the dyeing result data, the first processing parameter data of the first processing parameter, and the second processing parameter data of the second processing parameter by Shapley value method to obtain a cross-validation result of the first processing parameter and the second processing parameter.

An interaction diagram is generated according to the cross-validation result, values of at least one of the first processing parameter and the second processing parameter can be adjusted based on a relationship between the first processing parameter and the second processing parameter in the interaction diagram, then the adjusted parameters can be applied for subsequent anodic and dyeing processes accordingly.

Referring to FIG. 19, an interaction diagram of the concentration of sealing solution and the concentration of oxalic acid is shown, the relationship between the concentration of sealing solution and the concentration of oxalic acid in different parameter data value intervals is shown. For example, when the concentration of oxalic acid ranges from 'ca.' to 'cb' ('ca'<'cb'), the concentration of sealing solution ranges from 'cm' to 'cn' ('cm'<'cn'), there is a significant negative correlation relative to the dyeing result; when the concentration of oxalic acid ranges from 'co' to 'cp' ('co'<'cp'), the concentration of sealing solution ranges from 'ct' to 'cs' ('ct'<'cs'), there is a significant positive correlation relative to the dyeing result. The concentration of oxalic acid and/or the concentration of sealing solution can be adjusted according to the positive correlation and the negative correlation. In some embodiments, the adjusted concentration of oxalic acid is located in the intervals corresponding to the positive correlation, and the concentration of sealing solution should be adjusted in the same way, for example, if the concentration of oxalic acid is increased, then the concentration of sealing solution should also be increased; in a further embodiment, the adjusted concentration of oxalic acid is located in the intervals corresponding to the negative correlation, and the concentration of sealing solution should be adjusted in an opposite way, for example, if the concentration of oxalic acid is increased, then the concentration of sealing solution should be decreased.

Referring to FIG. 20, in some embodiments, the data analysis method further includes:

S136: creating a decision tree corresponding to the plurality of sample data groups, the decision tree comprises multiple nodes, each node corresponding to one processing parameter;

S137: determining multiple paths from a root node to each leaf node, each path comprises at least two nodes;

S138: determining sample data corresponding to each path and a sample size of the sample data corresponding to the path, and selecting the path with the sample size large than a threshold of sample size and a defect rate exceeding a threshold of defect rate as an ultimate defect path.

S139: adjusting the value of the at least one essential processing parameter according to the ultimate defect path so as to avoid the ultimate defect path, and the adjusted processing parameters can be applied to subsequent process.

Specifically, during creating a decision tree, the root node represents all of the sample data, all the sample data are classified into two groups according to first processing parameter data (the first processing parameter data can be any processing parameter data of all the processing parameter data), for example, the sample data contains first processing parameter data exceeding a threshold value belongs to a group, the sample data contains first processing parameter data within or equal to the threshold value belongs to another group, then two groups of sample date are obtained, each group is corresponding to an internal node corresponding to the root node. After the classification, the sample data of each internal node can be classified into two groups again; by that analogy, the decision tree is created, and each node represents a processing parameter and some sample data. After creating the decision tree, multiple paths from a root node to each leaf node can be determined by traversing the decision tree, wherein each path includes at least two nodes, then sample size of each path can be determined by adding up sample size of all nodes in the path, and the defect rate of the sample data of each path can be determined by analyzing the defect rate of the sample data of the nodes of each path. Then the path with a sample size bigger than a threshold and a defect rate exceeding a threshold of defect rate is selected as an ultimate defect path.

In some embodiments, the paths with a sample size bigger than a threshold and a defect rate exceeding a threshold of defect rate are determined as candidate defect paths, and these candidate defect paths are ranked by defect rate in selecting the first N (N is a positive integer) candidate defect paths as the ultimate defect paths.

Each defect path includes at least two nodes, and each node represents a processing parameter satisfying a default condition, such as the first processing parameter with parameter data exceeding the threshold value of a first parameter. For example, the defect path can be cleaning time longer than 20 min, concentration of oxalic acid higher than 40, and concentration of oxalic sulfuric higher than 20.

The value of the processing parameter can be adjusted according to the determined ultimate defect path for achieving anodized dyeing products of improved quality.

Referring to FIG. 21, in some embodiments, the data analysis method includes:

S140: determining a correlation graph of the at least one essential processing parameter relative to the dyeing result data according to the essential processing parameter and the plurality of sample data groups;

S141: adjusting the value of the essential processing parameter according to the correlation graph, and the adjusted parameters can be applied for the subsequent anodizing and dyeing process.

Specifically, the correlation graph of the essential processing parameter data and the dyeing result data can be determined according to the essential processing parameter data and the dyeing result data in the sample data, then the value of the essential processing parameter can be adjusted according to the correlation graph.

For example, FIG. 22 shows a correlation graph of the concentration of oxalic acid and the yield rate, the horizontal axis represents concentration of oxalic acid and the vertical axis represents the yield rate. When the concentration of oxalic acid is at the point 1, to improve the dyeing result, the concentration of oxalic acid should be adjusted to be within the area 1 or area 2.

In production, the value of processing parameter for anodizing and dyeing can be adjusted according to at least one of the essential processing parameters, the correlation graph of essential processing parameter data and the dyeing result data, the distribution of the essential processing parameter, the combination of the essential parameters, and the cross-validation result of the processing parameter combination, for improving the dyeing results of the anodized dyeing products.

Referring to FIG. 23, a computing device 100 is provided. The computing device 100 includes a display 1001, a processer 1002, a memory 1003, and communication busbar 1004, wherein the memory 1003 is configured for storing one or more computer programs 1005 executed by the processer 1002, the one or more computer programs 1005 include instructions for implementing some or all of the steps of the data analysis method.

It should be noted that, the computing device 100 is not limited to the structure illustrated here, In some embodiments, the computing device 100 can include more or less components than the structure shown in the figures, or some of the components can be combined or disassembly, and the positions of the components can be different. For example, the computing device 100 can include a camera.

The processer 1002 can include one or more process units, for example, the processer 1002 includes at least one of an application processor (AP), a modem, a graphics processing unit (GPU), an image signal processor (ISP), a controller, a video codec, a digital signal processor (DSP), a digital base band processor, a neural-network processing unit (NPU), and so on. The process units can be independent components or integrated into one or more processers.

In some embodiments, the processer 1002 is configured with a memory for storing instructions and data, preferably, the memory in the processer 1002 is a cache memory. The memory may hold instructions or data that have just been used or recycled by the processor 1002, and the instructions or data can be called directly from this memory if the processor 1002 needs to use the them again, avoiding repeated accesses, and reducing the latency of the processor 1002, thereby increasing the efficiency of the system.

In some embodiments, the processer 1002 includes one or more interfaces, the interfaces include at least one of inter-integrated circuit (I2C), inter-integrated circuit sound (I2S), pulse code modulation (PCM), universal asynchronous receiver/transmitter (UART), mobile industry processor interface (MIPI), general-purpose input/output (GPIO), SIM, USB, and so on.

In some embodiments, the memory 1003 includes a cache memory and nonvolatile memory, such as hard disk, memory, plug-in hard disk, Smart Media Card (SMC), Secure Digital (SD) card, Flash Card, at least one disk memory device, flash memory device, or other volatile solid state memory device.

According to some embodiments, a storage medium is provided for storing computer instructions, when this computer instruction is run on an electronic device, the electronic device performs the method steps described above to implement the data analysis method in the above embodiments.

According to some embodiments, a computer program is provided, and when running this program on a computer, the computer performs the method steps described above to implement the data analysis method in the above embodiments.

According to some embodiments, an apparatus is provided, the apparatus can be a chip, an element, or a module, the apparatus includes a processer and a connected memory, wherein the memory is configured for storing instructions for the computer. When the apparatus operates, the processer performs the instructions to drive the chip to perform the data analysis method in the above embodiments.

The computing device, storage medium, computer program, or chip provided by the application are configured for performing the data analysis method in the above embodiments, therefore the technical effect can be found in the corresponding methods provided above and will not be repeated here.

The units or elements can be physically in different pieces, the element shown as a unit can be one or more physical units positioned at one or more places. The object of the application can be implemented by part or all of the units shown in the exemplary embodiments.

Further, all the functional units shown in the exemplary embodiments can be integrated into one processing unit or separated in several combined units of any combination of the functional units, and the units can be implemented as hardware or software functional units.

The integrated unit implemented in the form of a software functional unit and sold or used as an independent product can be stored in a readable storage medium.

Based on this understanding, the technical solution of the present application can be embodied in the form of a software product in essence, or the part that contributes to the prior art, or all or part of the technical solution, and the software product stored in a storage medium comprises several instructions to cause a device (such as a single chip microcomputer, a chip, etc.) or a processor to execute all or part of the steps of the methods described in the various embodiments of the present application. The aforementioned storage medium includes: U disk, mobile hard disk, read-only memory (ROM), random access memory (RAM), magnetic disk or optical disk and other media that can store program codes.

While the invention has been described in detail in connection with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A data analysis method comprising:

acquiring a plurality of sample data groups, each of the plurality of sample data groups comprising dyeing result data and processing parameter data of multiple processing parameters, wherein the dyeing result data indicates dyeing results of anodized dyeing products and the processing parameter data indicates an anodizing and dyeing process performed on products to be anodized and dyed;

determining a contribution value of the processing parameter data of each processing parameter to the dyeing result data in each of the plurality of sample data groups;

determining at least one target processing parameter affecting the dyeing results by analyzing the contribution values of the processing parameter data;

determining a correlation graph of the at least one target processing parameter relative to the dyeing result data according to the target processing parameter and the plurality of sample data groups; and adjusting the value of the target processing parameter according to the correlation graph, and performing the anodizing and dyeing process on the products to be anodized and dyed using the adjusted parameters.

2. The data analysis method of claim 1, wherein the determining a contribution value of the processing parameter data of each processing parameter to the dyeing result data in each of the plurality of sample data groups further comprises:

determining a contribution value of the processing parameter data of each processing parameter to the dyeing result data in one of the sample data groups by Shapley value method.

3. The data analysis method of claim 1, wherein the determining a contribution value of the processing parameter data of each processing parameter to the dyeing result data in each of the plurality of sample data groups further comprises:

determining a first contribution value and a second contribution value of the processing parameter data of each processing parameter to the dyeing result parameters in each of the plurality of sample data groups based on a first algorithm model and a second algorithm model;

the determining at least one target processing parameter affecting the dyeing results by analyzing the contribution values of the processing parameter data further comprises:

performing data fusion on the first contribution value and the second contribution value of the processing parameter data of each processing parameter of the plurality of sample data groups to determine at least one target processing parameter affecting the dyeing results.

4. The data analysis method of claim 1, further comprises:
determining a relationship between different parameter values of each target processing parameter and a quality of the anodized dyeing products by a probability distribution of the anodized dyeing products qualified corresponding to each processing parameter and a probability distribution of the anodized dyeing products unqualified corresponding to each target processing parameter; wherein
the probability distribution of the anodized dyeing products qualified and the probability distribution of the anodized dyeing products unqualified are generated by kernel density estimation, according to the dyeing result data and target processing parameter data corresponding to each target processing parameter of the plurality of sample data groups.

5. The data analysis method of claim 4, further comprises:
determining a first value range of the at least one target processing parameter corresponding to qualified dyeing result and a second value range of the at least one target processing parameter corresponding to unqualified dyeing result, wherein the first value range is determined according to the probability distribution of the anodized dyeing products qualified of the at least one target processing parameter and the second value range is determined the probability distribution of the anodized dyeing products unqualified of the at least one target processing parameter, respectively;
adjusting values of the at least one target processing parameter according to the first value range and the second value range; and the adjusted parameters are applied for subsequent anodizing and dyeing process.

6. The data analysis method of claim 1, wherein the dyeing result data comprises dyeing yield data;
the determining a contribution value of the processing parameter data of each processing parameter to the dyeing result data in each of the plurality of sample data groups further comprises:
determining contribution values of the processing parameter data of each processing parameter to the dyeing yield data in each of the plurality of sample data groups; and
the determining at least one target processing parameter affecting the dyeing results by analyzing the contribution values of the processing parameter data comprises:
determining at least one target processing parameter affecting the dyeing yield by analyzing the contribution values of the processing parameter data.

7. The data analysis method of claim 1, wherein the dyeing result data comprises color deviation values, the method further comprises:
calculating a difference between a measured color value of the anodized dyeing products and a standard color value to obtain a color deviation value of each of the anodized dyeing products;
the determining a contribution value of the processing parameter data of each processing parameter to the dyeing result data in each of the plurality of sample data groups further comprises:

determining a contribution value of the processing parameter data of each processing parameter to the color deviation values in each of the plurality of sample data groups;
the determining at least one target processing parameter affecting the dyeing results by analyzing the contribution values of the processing parameter data further comprises:
determining at least one target processing parameter affecting the color deviation values by analyzing the contribution values of the processing parameter data.

8. The data analysis method of claim 7, wherein the measured color value comprises a L* value, an a* value, and a b* value determined by CIELAB color space, the color deviation value comprises a deviation of the L* value (DL), a deviation of the a* value (Da), and a deviation of the b* value (Db);
the calculating a difference between a measured color value of the anodized dyeing products and a standard color value to obtain a color deviation value of each of the anodized dyeing products comprises:
calculating a difference between the L* value and a standard L* value, calculating a difference between the a* value and a standard a* value, calculating a difference between the b* value and a standard b* value, to acquire the DL, the Da, and the Db, respectively;
the determining a contribution value of the processing parameter data of each processing parameter to the dyeing result data in each of the plurality of sample data groups further comprises:
in each of the plurality of sample data groups, determining a contribution value of the processing parameter data of each processing parameter to the DL, a contribution value of the processing parameter data of each processing parameter to the Da, and a contribution value of the processing parameter data of each processing parameter to the Db;
the determining at least one target processing parameter affecting the dyeing results by analyzing the contribution values of the processing parameter data further comprises:
determining a target processing parameter affecting the DL by analyzing the contribution values of the processing parameter data of each processing parameter to the DL, determining a target processing parameter affecting the Da by analyzing the contribution values of the processing parameter data of each processing parameter to the Da, and determining a target processing parameter affecting the Db by analyzing the contribution values of the processing parameter data of each processing parameter to the Db.

9. The data analysis method of claim 1, wherein the processing parameter data of multiple processing parameters comprises at least one of processing parameter data of chemical polishing, processing parameter data of anodizing process, processing parameter data of dyeing process, processing parameter data of sealing process, and processing parameter data of treatment after sealing process.

10. The data analysis method of claim 1, further comprises:
receiving multiple parameter data of the anodized dyeing products relating to dyeing;
removing parameter data unrelated to process results to obtain the processing parameter data of multiple processing parameters, the parameter data that unrelated to process results comprises signs of reaction vessel, starting times of the process, and ending times of the process.

11. The data analysis method of claim 1, further comprises:

creating a decision tree corresponding to the plurality of sample data groups, wherein the decision tree comprises multiple nodes, each node corresponding to one processing parameter and the margin value of the processing parameter;

traversing the decision tree to determine all node combinations of adjacent nodes; calculating a margin summation value of the margin values of at least two processing parameters of each node combination, wherein the at least two processing parameters comprises at least one-target processing parameter; and adding up the margin summation values of the node combinations with same processing parameter to obtain multiple total margin summation values, each total margin summation value corresponding to a parameter combination of the at least two processing parameters, then determining a target parameter combination that affects the dyeing results of the anodized dyeing products.

12. The data analysis method of claim 11, wherein the essential target parameter combination comprises a combination of a first processing parameter and a second processing parameter, the method further comprises:

analyzing the dyeing result data, first processing parameter data of the first processing parameter, and second processing parameter data of the second processing parameter of each of the plurality of sample data groups by Shapley value method, to obtain a cross-validation result of a combined effect of the first processing parameter and the second processing parameter in relation to the dyeing result.

13. The data analysis method of claim 12, further comprises:

generating an interaction diagram of the first processing parameter and the second processing parameter based on the cross-validation result of the first processing parameter and the second processing parameter;

adjusting values of at least one of the first processing parameter and the second processing parameter based on a relationship between the first processing parameter and the second processing parameter in the interaction diagram, and the adjusted parameters are applied for subsequent anodic and dyeing processes accordingly.

14. The data analysis method of claim 1, further comprises:

creating a decision tree corresponding to the plurality of sample data groups, the decision tree comprises multiple nodes, each node corresponding to one processing parameter;

determining multiple paths from a root node to each leaf node, each path comprises at least two nodes;

determining sample data corresponding to each path and a sample size of the sample data corresponding to the path, and selecting the path with the sample size large than a threshold of sample size and a defect rate exceeding a threshold of defect rate as an ultimate defect path.

15. The data analysis method of claim 14, further comprises:

adjusting the value of the at least one target processing parameter according to the ultimate defect path so as to avoid the ultimate defect path, and the adjusted processing parameters are applied to subsequent process.

16. A computing device, comprising at least one processor, a memory, and a communicator; wherein the at least one processer is connected to the memory and the communicator;

the memory is configured for storing instructions executable by the at least one processor;

the communicator is controlled by the at least one processer for communication;

the instructions cause the at least one processers to execute following steps:

acquiring a plurality of sample data groups, each of the plurality of sample data groups comprising dyeing result data and processing parameter data of multiple processing parameters, wherein the dyeing result data indicates dyeing results of anodized dyeing products and the processing parameter data indicates an anodizing and dyeing process performed on products to be anodized and dyed;

determining a contribution value of the processing parameter data of each processing parameter to the dyeing result data in each of the plurality of sample data groups;

determining at least one target processing parameter affecting the dyeing results by analyzing the contribution values of the processing parameter data;

determining a correlation graph of the at least one target processing parameter relative to the dyeing result data according to the target processing parameter and the plurality of sample data groups; and adjusting the value of the target processing parameter according to the correlation graph, and perform the anodizing and dyeing process on the products to be anodized and dyed using the adjusted parameters.

17. The computing device of claim 16, the instructions cause the at least one processer to execute following steps:

determining a relationship between different parameter values of each target processing parameter and a quality of the anodized dyeing products by a probability distribution of the anodized dyeing products qualified corresponding to each processing parameter and a probability distribution of the anodized dyeing products unqualified corresponding to each target processing parameter; wherein the probability distribution of the anodized dyeing products qualified and the probability distribution of the anodized dyeing products unqualified are generated by kernel density estimation, according to the dyeing result data and target processing parameter data corresponding to each target processing parameter of the plurality of sample data groups.

18. The computing device of claim 17, the instructions cause the at least one processer to execute following steps:

determining a first value range of the at least one target processing parameter corresponding to qualified dyeing result and a second value range of the at least one target processing parameter corresponding to unqualified dyeing result, where the first value range is determined according to the probability distribution of the anodized dyeing products qualified of the at least one target processing parameter and the second value range is determined according to the probability distribution of the anodized dyeing products unqualified of the at least one target processing parameter, respectively;

adjusting values of the at least one target processing parameter according to the first value range and the second value range; and the adjusted parameters are applied for subsequent anodizing and dyeing process.

19. A non-transitory computer readable storage medium that stores instructions executable by one or more processors to perform a data analysis method, comprising:

acquiring a plurality of sample data groups, each of the plurality of sample data groups comprising dyeing result data and processing parameter data of multiple processing parameters, wherein the dyeing result data indicates dyeing results of anodized dyeing products and the processing parameter data indicates an anodizing and dyeing process performed on products to be anodized and dyed;

determining a contribution value of the processing parameter data of each processing parameter to the dyeing result data in each of the plurality of sample data groups;

determining at least one target processing parameter affecting the dyeing results by analyzing the contribution values of the processing parameter data;

determining a correlation graph of the at least one target processing parameter relative to the dyeing result data according to the target processing parameter and the plurality of sample data groups; and adjusting the value of the target processing parameter according to the correlation graph, and performing the anodizing and dyeing process on the products to be anodized and dyed using the adjusted parameters.

*  *  *  *  *